US012387562B2

(12) United States Patent
Bulzacki et al.

(10) Patent No.: US 12,387,562 B2
(45) **Date of Patent: *Aug. 12, 2025**

(54) SYSTEMS, METHODS AND DEVICES FOR MONITORING GAME ACTIVITIES

(71) Applicant: ARB LABS INC., Toronto (CA)

(72) Inventors: Adrian Bulzacki, Mississauga (CA); Vlad Cazan, Thornhill (CA)

(73) Assignee: ARB LABS INC., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,069

(22) Filed: Jul. 4, 2023

(65) Prior Publication Data

US 2023/0343172 A1 Oct. 26, 2023

Related U.S. Application Data

(63) Continuation of application No. 17/345,747, filed on Jun. 11, 2021, now Pat. No. 11,694,510, which is a continuation of application No. 16/282,768, filed on Feb. 22, 2019, now Pat. No. 11,062,558, which is a continuation of application No. 15/518,874, filed as application No. PCT/CA2015/000539 on Oct. 16, 2015, now Pat. No. 10,242,527.

(Continued)

(51) Int. Cl.
*G07F 17/32* (2006.01)

(52) U.S. Cl.
CPC .......... *G07F 17/3241* (2013.01); *G07F 17/32* (2013.01); *G07F 17/3206* (2013.01); *G07F 17/3225* (2013.01); *G07F 17/3293* (2013.01); *G07F 17/322* (2013.01)

(58) Field of Classification Search
None
See application file for complete search history.

(56) References Cited

U.S. PATENT DOCUMENTS 10,242,527 B2 * 3/2019 Bulzacki ............. G07F 17/3241
11,062,558 B2 * 7/2021 Bulzacki ................ G07F 17/32

(Continued)

OTHER PUBLICATIONS

United States Patent & Trademark Office (USPTO), Non Final Rejection to U.S. Appl. No. 17/345,747, filed Sep. 23, 2022.

*Primary Examiner* — Damon J Pierce

(74) *Attorney, Agent, or Firm* — Norton Rose Fulbright Canada LLP

(57) ABSTRACT

Systems, methods, devices, and computer readable media for monitoring card game activities at gaming tables, such as for example, counting the number of card hands at gaming tables. The devices may include a sensor array network to detect game events; a microcontroller for running logic level code for checking sensors of the sensors of the sensor array network for pre-defined thresholds defining the detected game events and in response generating game event data; and a connection cable for coupling to a server device for transmitting the game event data. Systems may connect client hardware devices with sensors for monitoring card game activities. A game monitoring server may collect, process and aggregate hand event data received from the client hardware devices to generate hand count data for gaming tables. A front end interface device may receive notifications relating to hand count data for provision to end user systems.

20 Claims, 37 Drawing Sheets

Related U.S. Application Data

(60) Provisional application No. 62/168,395, filed on May 29, 2015, provisional application No. 62/064,675, filed on Oct. 16, 2014.

(56) References Cited

U.S. PATENT DOCUMENTS

| | | | | |
|---|---|---|---|---|
| 11,694,510 | B2 * | 7/2023 | Bulzacki | G07F 17/3225<br>463/43 |
| 2005/0288086 | A1 * | 12/2005 | Schubert | G07F 17/3241<br>463/11 |
| 2006/0183540 | A1 * | 8/2006 | Grauzer | G07F 17/32<br>463/29 |

* cited by examiner

1008

FIG. 8 illustrates sensor activation indicative of a single chip for the configuration of FIG. 7.

2400

3100

3500

SYSTEMS, METHODS AND DEVICES FOR MONITORING GAME ACTIVITIES

CROSS REFERENCE TO OTHER RELATED APPLICATIONS

This application is a continuation of U.S. application Ser. No. 17/345,747, filed on Jun. 11, 2021, which is a continuation of U.S. application Ser. No. 16/282,768 (now U.S. Pat. No. 11,062,558) filed on Feb. 22, 2019, which is a continuation of U.S. application Ser. No. 15/518,874 (now U.S. Pat. No. 10,242,527) filed on Apr. 13, 2017 which is a US National Stage Entry of PCT Application No. PCT/CA2015/000539 filed on Oct. 16, 2015, which claims all benefit, including priority, to U.S. Application No. 62/064,675 filed Oct. 16, 2014, entitled SYSTEMS, METHODS AND DEVICES FOR MONITORING GAME ACTIVITIES, incorporated herein by reference. The application also claims all benefit to U.S. Application No. 62/168,395 filed May 29, 2015, entitled SYSTEMS, METHODS AND DEVICES FOR MONITORING BETTING ACTIVITIES, incorporated herein by reference.

FIELD

Embodiments described herein relate generally to systems, methods and devices for monitoring game activities at gaming tables in casinos and other gaming establishments, and in particular to systems, methods and devices for monitoring game activities including card game activities.

INTRODUCTION

Casinos and gaming establishments may offer a variety of card games to customers. Card games involve various game activities, such as card play and betting, for example. A card game may be played at a gaming table by players, including a dealer and one or more customers. The game activities may involve the dealer and customers. It may be desirable for casinos or gaming establishments to monitor gaming activities at different levels of granularity for security and management purposes. There exists a need for improved systems, methods and devices for monitoring game activities at a gaming table, or at least alternatives.

SUMMARY

Embodiments described herein relate to systems, methods and devices for monitoring game activities at gaming tables in casinos and other gaming establishments. For example, embodiments described herein relate to systems, methods and devices for monitoring card game activities at gaming tables. Each player, including the dealer and customer(s), may be dealt a card hand. Embodiments described herein may include devices and systems particularly configured to monitor game activities that include card hands, such as for example, counting the number of card hands at a particular gaming table. Players may have multiple card hands over multiple games. Embodiments described herein may count the number of hands at a gaming table, where the hands may be played by various players. The player hand count may be over a time period. Player hand count may be associated with a particular gaming table, dealer, customer, geographic location, subset of gaming tables, game type, and so on. The player hand count data may be used by casino operators and third parties for data analytics, security, customer promotions, casino management, and so on.

Various systems, devices and methods are described herein for monitoring game activities including counting hands at gaming tables. For example, the devices may include sensors to trigger game events based on activation and deactivation for defined threshold values. Sensors may trigger transmission of game event data for further processing and transformation. The devices may be integrated into existing gaming tables to monitor game activities at the game table.

In an aspect, embodiments described herein may involve a device for monitoring game activities at gaming tables comprising: a sensor array network to detect game events; a microcontroller for running logic level code for checking sensors of the sensors of the sensor array network for pre-defined thresholds defining the detected game events and in response generating game event data; and a connection cable for coupling to a server device for transmitting the game event data. The sensor array network may include sensors with optical receiver and emitter (e.g., IR receiver and emitter). The microcontroller may generate hand start events and hand stop events based on sensor activation and sensor deactivation for threshold values. The device may include an imaging device for gesture recognition.

In another aspect, the card game activities include symbolic hand gestures performed by a human dealer before or after a gaming hand is played; wherein the hand count data include one or more characteristics related to the performance of the symbolic hand gestures; the one or more characteristics indicative of (i) whether the symbolic hand gestures were performed in association with the gaming hand; and (ii) if the symbolic gestures were performed in association with the gambling hand, a quality score associated with performance of the symbolic hand gestures.

In another aspect, the one or more sensors are further configured to generate one or more photographic frames, each one of the one or more photographic frames capturing one or more positions of body parts of the human dealer at a corresponding point in time during the performance of the symbolic hand gestures; and wherein each client hardware device is configured to: electronically monitor the one or more photographic data frames; automatically determine whether the performance of the symbolic hand gestures has been initiated; upon determining that the performance of the symbolic hand gestures has been initiated, generate a start hand gesture time stamp indicative when the performance of the symbolic hand gestures was initiated; automatically extract position data associated with the one or more positions of the body parts of the human dealer from the one or more photographic data frames generated by the one or more sensors during the performance of the symbolic hand gestures; transform the extracted position data into the quality score associated with the performance of the symbolic hand gestures; automatically determine that the performance of the symbolic hand gestures has ceased; upon determining that the performance of the symbolic hand gestures has ceased, generate an end hand gesture time stamp indicative when the performance of the symbolic hand gestures has ceased; and transmit, to the game monitoring server as part of the hand count data, (i) the start hand gesture time stamp, (ii) the end hand gesture time stamp, and (iii) the quality score associated with the performance of the symbolic hand gestures.

In another aspect, the notifications received by the front end interface device are based on at least one of (i) the start hand gesture time stamp, (ii) the end hand gesture time stamp, and (iii) the quality score associated with the performance of the symbolic hand gestures.

In another aspect, the front end interface device receives control commands from an end user system for controlling the provision or display of the aggregated hand count data. The control commands may be used to filter the hand count data so that only a subset of hand count data of interest is provided to the end user system. The control commands may identify one or more gaming tables to request hand count data specific to the one or more gaming tables. The control commands may identify a type of hand count data, such as video or photographic frames. The control commands may identify a preferred time range. The control commands may identify a dealer. The control commands may identify a player. The control commands may identify a request for real-time data feeds in response to detected of a particular type of hand count data for real time monitoring. These are examples provided for illustrative purposes and other control commands may be used to filter or otherwise transform the hand count data for provision to the end user system. The end user system may be used for security or management purposes for example.

In another aspect, the game monitoring server is configured to associate at least one of (i) the start hand gesture time stamp, (ii) the end hand gesture time stamp, and (iii) the quality score associated with the performance of the symbolic hand gestures with an electronic profile associated with the human dealer.

In another aspect, the game monitoring server is configured to: monitor a plurality of hand count events associated with the human dealer, the plurality of hand count events being associated with a plurality of performed symbolic hand gestures, each one of the plurality of performed symbolic hand gestures corresponding to a corresponding quality score; continuously track an average quality score for the human dealer in the electronic profile associated with the human dealer; and upon determining that the average quality score has decreased below a pre-defined threshold, automatically indicate, through the notifications received by the front end interface device from the game monitoring server, an electronic request to alternate the human dealer.

In another aspect, the hand count event data comprises hand start event data comprising a start time and a table identifier, and hand stop event data comprising a stop time and the table identifier, wherein the table identifier identifies a gaming table of the plurality of gaming tables, and wherein the game monitoring server is configured to determine a hand duration using the hand start event data and the hand stop event data.

In another aspect, the game monitoring server generates the hand count data by determining estimated values for hands per defined period of time for the plurality of gaming tables.

In another aspect, the game monitoring server generates the hand count data by determining, for each gaming table of the plurality of gaming tables, an estimated value for an earning coefficient for the respective table.

In another aspect, the game monitoring server determines player hand count data for at least one player playing cards at at least two gaming tables of the plurality of gaming tables, wherein the at least one player is identified at each of the at least two gaming tables.

In another aspect, the front end interface device generates an interface for provisioning notifications to the end user systems, wherein the interface comprises: a dashboard page displaying, for the plurality of gaming tables, in near real-time hand count data, dealer data, and video surveillance; a management page for management of the plurality of gaming tables; and a historical data page displaying historical hand count data for the plurality of gaming tables.

In another aspect, a device for monitoring game activities at gaming tables is provided, comprising: a sensor array network to detect game events; a microcontroller for running logic level code for checking sensors of the sensors of the sensor array network for pre-defined thresholds defining the detected game events and in response generating game event data; and a connection cable for coupling to a server device for transmitting the game event data.

In another aspect, the sensor array network comprises sensors with an optical receiver and an emitter.

In another aspect, the microcontroller generates hand start events and hand stop events based on sensor activation and sensor deactivation upon exceeding or falling within threshold values.

In another aspect, the device further comprises an imaging device for gesture recognition.

In another aspect, the imaging device for gesture recognition includes one or more cameras.

In another aspect, the detected game events include symbolic hand gestures performed by a human dealer before or after a gaming hand is played; wherein the hand count data include one or more characteristics related to the performance of the symbolic hand gestures; the one or more characteristics indicative of (i) whether the symbolic hand gestures were performed in association with the gaming hand; and (ii) if the symbolic gestures were performed in association with the gambling hand, a quality score associated with performance of the symbolic hand gestures.

In another aspect, the imaging device for gesture recognition is configured to: generate one or more photographic frames, each one of the one or more photographic frames capturing one or more positions of body parts of the human dealer at a corresponding point in time during the performance of the symbolic hand gestures; and the microcontroller is configured to: electronically monitor the one or more photographic data frames; automatically determine whether the performance of the symbolic hand gestures has been initiated; upon determining that the performance of the symbolic hand gestures has been initiated, generate a start hand gesture time stamp indicative when the performance of the symbolic hand gestures was initiated; automatically extract position data associated with the one or more positions of the body parts of the human dealer from the one or more photographic data frames generated by the one or more sensors during the performance of the symbolic hand gestures; transform the extracted position data into the quality score associated with the performance of the symbolic hand gestures; automatically determine whether the performance of the symbolic hand gestures has ceased; upon determining that the performance of the symbolic hand gestures ceased, generate an end hand gesture time stamp indicative when the performance of the symbolic hand gestures ceased; and transmit, as part of the hand count data, (i) the start hand gesture time stamp, (ii) the end hand gesture time stamp, and (iii) the quality score associated with the performance of the symbolic hand gestures.

In another aspect, a method for monitoring game activities at a plurality of gaming tables is provided, comprising: detecting activation of one or more sensors in a sensor array network for a period of time defined by an activation threshold value; generating hand start event data in response to the detected activation, wherein the hand start event data comprises a start time and a gaming table identifier; transmitting the hand start event data; detecting deactivation of one or more sensors in a sensor array network for a period of time defined by a deactivation threshold value; generating hand stop event data in response to the detected deactivation, wherein the hand stop event data comprises a stop time and the gaming table identifier; transmitting the hand stop event data; and processing the hand start event data and the hand stop event data to generate hand count data.

In another aspect, a method for monitoring performance of symbolic hand gestures performed by a human dealer at a gaming table is provided, comprising: generating one or more photographic frames, each one of the one or more photographic frames capturing one or more positions of body parts of the human dealer at a corresponding point in time during the performance of the symbolic hand gestures; and wherein each client hardware device is configured to: electronically monitoring the one or more photographic data frames; automatically determining whether the performance of the symbolic hand gestures has been initiated; upon determining that the performance of the symbolic hand gestures has been initiated, generating a start hand gesture time stamp indicative when the performance of the symbolic hand gestures was initiated; automatically extracting position data associated with the one or more positions of the body parts of the human dealer from the one or more photographic data frames generated by the one or more sensors during the performance of the symbolic hand gestures; transforming the extracted position data into a quality score associated with the performance of the symbolic hand gestures; automatically determining that the performance of the symbolic hand gestures has ceased; upon determining that the performance of the symbolic hand gestures has ceased, generating an end hand gesture time stamp indicative when the performance of the symbolic hand gestures has ceased; and transmitting, to a server as part of hand count data, (i) the start hand gesture time stamp, (ii) the end hand gesture time stamp, and (iii) the quality score associated with the performance of the symbolic hand gestures.

In another aspect, a computer readable medium configured for monitoring game activities at a plurality of gaming tables is provided, the computer-readable medium having instructions stored thereon, the instructions, which when executed, cause a processor to perform steps comprising: detecting activation of one or more sensors in a sensor array network for a period of time defined by an activation threshold value; generating hand start event data in response to the detected activation, wherein the hand start event data comprises a start time and a gaming table identifier; transmitting the hand start event data; detecting deactivation of one or more sensors in a sensor array network for a period of time defined by a deactivation threshold value; generating hand stop event data in response to the detected deactivation, wherein the hand stop event data comprises a stop time and the gaming table identifier; transmitting the hand stop event data; and processing the hand start event data and the hand stop event data to generate hand count data.

In another aspect, a computer-readable medium configured for monitoring performance of symbolic hand gestures performed by a human dealer at a gaming table is provided, the computer-readable medium having instructions stored thereon, the instructions, which when executed, cause a processor to perform steps comprising: generating one or more photographic frames, each one of the one or more photographic frames capturing one or more positions of body parts of the human dealer at a corresponding point in time during the performance of the symbolic hand gestures; and wherein each client hardware device is configured to: electronically monitoring the one or more photographic data frames; automatically determining whether the performance of the symbolic hand gestures has been initiated; upon determining that the performance of the symbolic hand gestures has been initiated, generating a start hand gesture time stamp indicative when the performance of the symbolic hand gestures was initiated; automatically extracting position data associated with the one or more positions of the body parts of the human dealer from the one or more photographic data frames generated by the one or more sensors during the performance of the symbolic hand gestures; transforming the extracted position data into a quality score associated with the performance of the symbolic hand gestures; automatically determining that the performance of the symbolic hand gestures has ceased; upon determining that the performance of the symbolic hand gestures has ceased, generating an end hand gesture time stamp indicative when the performance of the symbolic hand gestures has ceased; and transmitting, to a server as part of hand count data, (i) the start hand gesture time stamp, (ii) the end hand gesture time stamp, and (iii) the quality score associated with the performance of the symbolic hand gestures.

In an aspect, embodiments described herein may involve method for monitoring game activities at gaming tables comprising: detecting activation of one or more sensors in a sensor array network for a period of time defined by an activation threshold value; generating hand start event data in response to the detected activation, wherein the hand start event data comprises a start time and a gaming table identifier; transmitting the hand start event data; detecting deactivation of one or more sensors in a sensor array network for a period of time defined by a deactivation threshold value; generating hand stop event data in response to the detected deactivation, wherein the hand stop event data comprises a stop time and the gaming table identifier; transmitting the hand stop event data; and processing the hand start event data and the hand stop event data to generate hand count data.

In an aspect, embodiments described herein may involve a system for monitoring game activities at a plurality of gaming tables comprising: a plurality of client hardware devices, each client hardware device comprising sensors for monitoring card game activities, wherein the card game activities comprise hand count events, and wherein each client hardware device is configured to detect the hand count events and generate hand count event data in response; a game monitoring server for collecting, processing and aggregating the hand event data received from the client hardware devices to generate hand count data for the plurality of gaming tables; and a front end interface device for receiving notifications relating to hand count data from the game monitoring server for provision to end user systems. The hand count event data may include hand start event data comprising a start time and a table identifier, and hand stop event data comprising a stop time and the table identifier, wherein the table identifier identifies a gaming table of the plurality of gaming tables, and wherein the game monitoring server is configured to determine a hand duration using the hand start event data and the hand stop event data. The game monitoring server may generate the hand count data by determining estimated values for hands per defined period of time for the plurality of gaming tables. The game monitoring server may generate the hand count data by determining, for each gaming table of the plurality of gaming tables, an estimated value for an earning coefficient for the respective table. The front end interface device may generate an interface for provisions to the end user systems, wherein the interface may comprise: a dashboard page displaying, for the plurality of gaming tables, in near real-time hand count data, dealer data, and video surveillance; a management page for management of the plurality of gaming tables; and a historical data page displaying historical hand count data for the plurality of gaming tables.

Various illustrative example aspects and embodiments are described herein.

DRAWINGS

Various aspects and embodiments, and advantages offered thereby, are shown in the drawings, and described in connection therewith.

Figure 1:
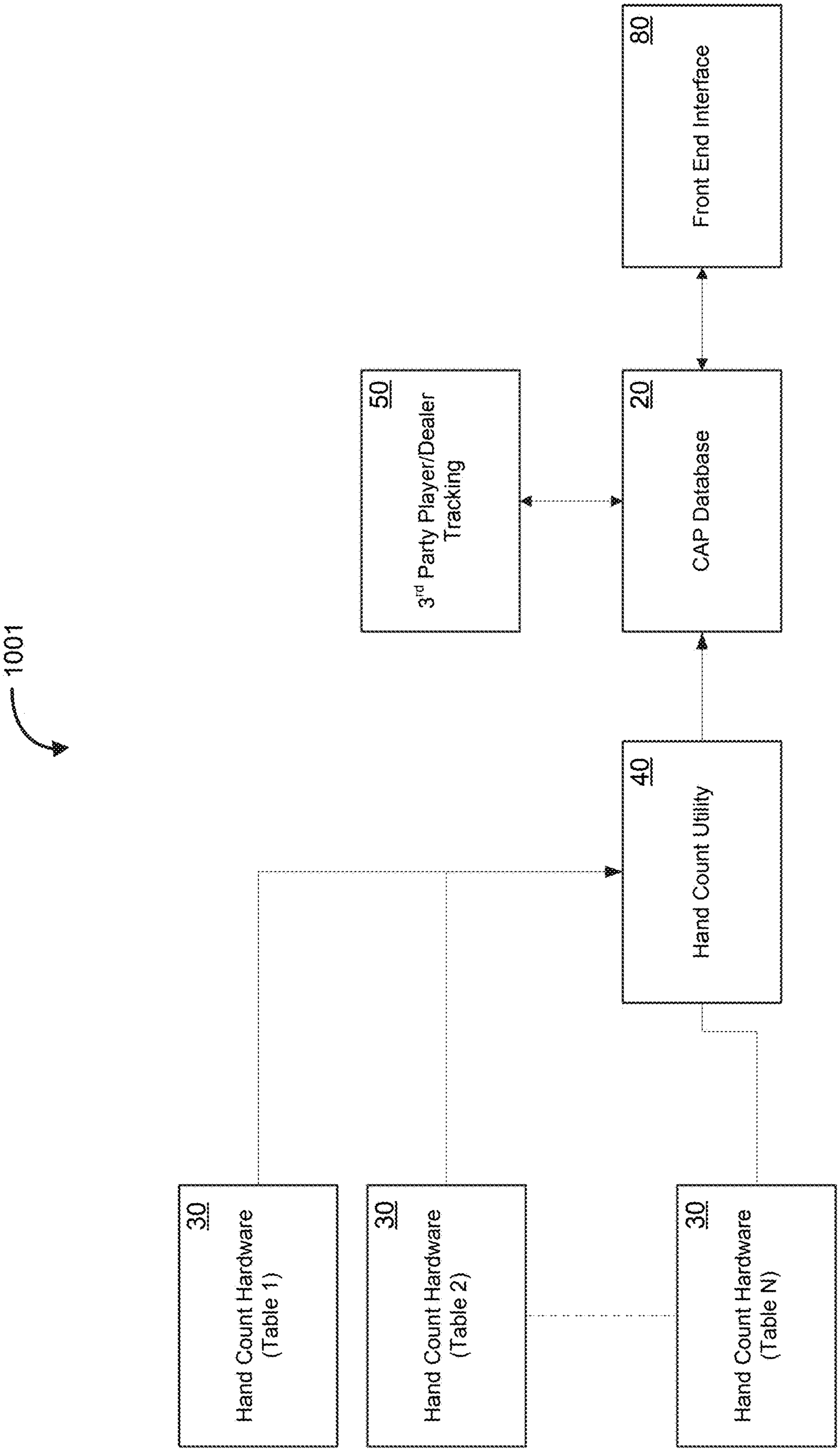
FIG. 1 illustrates a block diagram of a system for monitoring game activities at gaming tables, according to some embodiments.

These drawings depict exemplary embodiments for illustrative purposes, and variations, alternative configurations, alternative components and modifications may be made to these exemplary embodiments.

DETAILED DESCRIPTION OF EMBODIMENTS

The embodiments described herein are implemented by physical computer hardware embodiments. The embodiments described herein provide useful physical machines and particularly configured computer hardware arrangements of computing devices, server devices, electronic game monitoring devices, sensor devices, processors, memory, networks, for example. The embodiments described herein, for example, are directed to computer apparatuses, and methods implemented by computers through the processing of electronic data signals.

The embodiments described herein involve computing devices, servers, electronic game monitoring devices, sensors, imaging devices, receivers, transmitters, processors, memory, display, networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

Substituting the computing devices, servers, electronic game monitoring devices, sensor devices, receivers, transmitters, processors, memory, display, networks particularly configured to implement various acts for non-physical hardware, using mental steps for example, may substantially affect the way the embodiments work.

Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

In the context of a gaming environment (e.g., a casino), many gaming venues currently do not have an ability to accurately track how much money a player wagers at a table, the number of hands played, or whether dealers perform sufficient hand "clearing" gestures.

The data may often be collected in various informal and/or inaccurate manners, such as based on pit bosses estimating a player's average bet. These procedures often only generate intermittent data, with no assurance that the player's actually bet is the same as the observed bet amounts. Various issues may arise, for example, where comp disputes arise between players and the gaming venue.

Accurate and/or real-time or near-real-time tracking of hands, bets, and/or gestures may be desirable to aid in monitoring and/or reacting to various tracked and/or monitored information. For example, such information may be used to more accurately update various electronic profiles storing information related to individuals (e.g., a dealer, a player) at a gaming venue and associate such information to tracked information, such as number of hands played, whether a dealer made sufficient hand clearing, etc. In some embodiments, the information may be processed and/or communicated with other systems to perform various types of analyses, including, for example, determining an average bet amount per hand, an average profit per hand, identifying suspicious behaviors/patterns, identifying theft, identifying collusion, etc. For example, the betting trends could help identify Blackjack card-counters through their betting fluctuations and Baccarat players colluding with each other to exploit a casino's rebate program through contrasted betted pattern (strategic spread betting split between pairs of players).

In some embodiments, statistical information may be generated which may be provided to a suitably configured display through a user interface, etc. Accurate trends in the amounts wagered by a player, may help provide new possibilities for incentivizing a player to bet more.

Some potential advantages that may be provided with more accurate tracking include an ability to increase profit margins realized by a gaming venue, or to gain a competitive advantage against other venues. For example, some gaming venues provide various rebates to high-spending customers, but in some situations, due in part to inaccurate tracking of spend and revenues, certain high-spending customers were able to derive a profit by taking advantage of the mismatched rebate system in providing comps.

To help address this problem and/or other problems, a system is provided (e.g., a bet recognition & hand count system that tracks various bets made on table games such as Baccarat and Blackjack. Embodiments described herein relate to systems, methods and devices for monitoring game activities at gaming tables in casinos and other gaming establishments. For example, embodiments described herein relate to systems, methods and devices for monitoring card game activities at gaming tables. Card game activities may generally include dealing card hands, betting, playing card hands, and so on. Card game activities may not be simply limited to those games with "cards", other types of games involving physical markers may also be included (e.g., Pai Gow tiles, mah-jong tiles), dice, etc.

Each player, including the dealer and customers, may be dealt a card hand. That is, for a card game, each active player may be associated with a card hand. The card hand may be dynamic and change over rounds of the card game through various plays. A complete card game may result in a final card hand for remaining active players, and a determination of a winning card hand amongst those active players' hands. For example, some games may involve the taking of "tricks" and some other games have hand-based rounds of play (e.g., Texas Hold-em poker). The card movement and/or activities related to cards may be tracked by the system.

Embodiments described herein may monitor game activities that include card hands, such as for example, counting the number of card hands played at a particular gaming table. A player may have multiple card hands over multiple games. Hands may be associated with players, or dealers. For example, a player may play various hands of Blackjack across the duration of an evening of play, but take various breaks where the player simply sits at the table without actually playing hands.

Embodiments described herein may count the number of hands played at a gaming table, where the hands may be played by various players, tracking a "player hand count" that may be associated with a particular player and/or an electronic profile associated with the player. The player hand count may be over a time period. Player hand count may be associated with a particular gaming table, dealer, customers, geographic location, subset of gaming tables, game type, and so on.

The player hand count data may be used by casino operators and third parties for data analytics, security, customer promotions, casino management, and so on. For example, player hand count data may be associated with a timestamp and gaming table identifier to link data structures for further data analysis, processing and transformation. The player hand count information can be used, for example, to determine which games are more profitable from a profit per hand perspective, how long individual hands for a particular game take to play, etc. Characteristics known about a particular player, table, etc., may be utilized as part of an analysis (e.g., real time performance of a table relative to its minimum, and maximum bet limits, as well as betting fluctuations).

Embodiments described herein may also be provided in relation to gesture tracking as it relates to dealer hand "clearing" and detecting potential pocketing (e.g., of chips and/or other tokens) by dealers and/or cashiers.

For example, in compliance with various procedures, dealer and cashiers may be required to perform a hand-clearing motion (a "hand wash") each time they arrive at the table, leave the table, and want to touch any part of their body (e.g., to scratch an itch). A system may be provided where there are various components and/or sensors (e.g., a depth sensor unit mounted above the table to track the dealer or cashier's hands in real or near-real time). When a dealer or cashier clears his hands and performs a hand wash, the system logs this action and assigns it with a quality score and/or a value of "good" or "bad".

Over a period of time, as a dealer or cashier may perform many such "hand washes" and the performance and/or level of compliance associated with these "hand washes" may be tracked in relation to the dealer or cashier. For example, the hand clearing system may be configured and/or customizable to facilitate the specification to what degree dealers' hands must be shown to the sensors (e.g., overhead cameras) to be considered a "good" hand wash or a "bad" hand wash (which may be an infraction). After setting specifications, if a dealer or cashiers perform a hand wash with only one of their hands, or their hands are not fully pointing up, the system may log such an action as a "bad" hand wash, and accordingly, the system may provide real-time detailed event reports, notifications, and/or control signals from any table in the gaming venue.

In some embodiments, a pocketing detection unit and/or functionality may be provided by the system, for example, another depth sensor unit may be mounted on the ceiling, facing the dealer or cashier having a field of vision (e.g., at a 45-degree angle). This functionality may be used to track the dealer or cashier's body and logs actions such as "pocketing," "head touch," and "body touch". Accordingly, the pocketing detection unit may provide information that can be combined with other data received at various sensors for providing determinations which may be corroborated with data from various sources, in a manner responsive to the received data. For example, the pocketing unit may be customized and/or configured to accurately recognize infractions: if a "good" hand wash was performed a few seconds before one of these actions was recorded, the system logs this action as safe. If the dealer or cashier did not perform a hand wash before the action, then the system alerts security personnel and logs this action as an infraction. The information may be available to a user interface or dashboard is accessible to management from any computer or mobile device in the casino. In some embodiments, an electronic alert is automatically generated and/or various control instructions may be provisioned (e.g., a lockdown procedure, an investigation, a dealer alternation).

In accordance with an aspect of embodiments described herein, devices may be used to retrofit gaming tables. For example, the system may be adapted to automatically and accurately provide a casino's management with real time information (e.g., actual wagers per player per hand) while reducing and/or eliminating the need to modify a gaming venue's dealer procedures, chips, or tables.

The devices may be integrated with the gaming tables to provide a smooth working area in a manner that does not catch on cards or chips. The device may not require changing of a gaming table top as it may be integrate within existing table top structure. There are various forms of retrofit, for example, in a first embodiment, the device may be designed to reside on top of a playing surface (e.g., on top of the felt), without the need to modify the playing surface itself. In a second embodiment, the device may be partially or fully residing underneath a playing surface (e.g., under the felt), and have various sensors (e.g., optical sensors and corresponding reflection detectors, magnetic sensors, pressure sensors) provided which are used to track cards and/or other objects placed on top of the felt.

In accordance with another aspect of embodiments described herein, devices for monitoring game activities may include sensors, such as, for example, laser sensors with optical emitter and receiver. Laser sensors, instead of other types such as ambient light sensors, may be advantageous to reduce the effect of lighting in the environment, to not require special table top felt material, to waterproof the device, and so on. Cameras may be provided, which may be able to capture streams of photographic frames and/or video data.

Ambient light sensors may not work well if a part of the table is not well lit, as those types of sensors are looking for darkness for object detection. In contrast, embodiments described herein use optical receiver and emitter sensors that look for light for object detection. Additional types of sensors include radio frequency, pressure sensors, electrical/magnetic field sensors and optical sensors.

The sensors may be organized to form a sensor array. The device may further include a chip that is an infrared receiver and infrared emitter or transmitter for electronic data exchange. Embodiments described herein include devices with sensors that are particularly configured and positioned relative to the play area on the gaming table. For example, a sensor array may be positioned proximate to the card play area. The device may be configured to provide a particular distance between sensor and card play area, such as one centimeter distance between the card and the sensor.

In accordance with another aspect of embodiments described herein, devices may receive power and retrieve data off of the sensors used for monitoring game activities. The game activity data (which may also be referred to herein as game event data) includes hand count data events, such as hand start event data and hand stop event data. Hand start event data indicates the start of a new hand. Hand stop event data indicates the end of a hand. Together with timestamps these values may be used to compute hand duration and other data values. The sensors may be positioned on the gaming table to detect card hand activities and trigger hand start events and hand stop events. The sensors may provide event data defining various card play events to other system components. The sensors may deliver real time data regarding card play activity, including hand start event data and hand stop event data.

Hand count data may include, for example determining estimated values for hands per defined period of time for the plurality of gaming tables; determining, for each gaming table of the plurality of gaming tables, an estimated value for an earning coefficient for the respective table; and/or determining player hand count data for at least one player playing cards at least two gaming tables of the plurality of gaming tables, wherein the at least one player is identified at each of the at least two gaming tables.

In accordance with another aspect of embodiments described herein, devices may be configured with particular timing or threshold value of when the sensor would be set off to transmit event data used to count card hands. An example trigger for hand start event data may be sensor activation for a threshold value, for example two, three or four seconds. An example trigger for hand stop event data may be sensor deactivation for a threshold value.

In accordance with another aspect of embodiments described herein, devices may be configured to detect that there are different ways to shuffle cards on a gaming table in order to effectively monitor card game activity. For example, devices may include an extra connector to a manual card shoe. For this example, if the device determines that there are no cards in shoe then the device deactivates electronic monitoring of the gaming table.

In accordance with another aspect of embodiments described herein, devices may be configured to implement fine tuning of brightness for sensors that sense cards, chips and other game related objects. Embodiments of devices may be configured to differentiate between cards and chips, and other various game related objects.

In accordance with another aspect of embodiments described herein, devices monitor additional game activities to determine a player count. For example, the devices may include light emitters with player specific messaging. This may draw people more into the game. The game activity data may include both player count data and hand count data, which may be valuable for casinos for security, management, and data analytics. For example, a casino may determine a link between a game and a dealer, and also a dealer and a customer, through the hand count and player count data. A casino may provide real-time compensation to players using the processed hand count and player count data. Accordingly, the systems, devices and methods in accordance with embodiments described herein may provide various levels of granularity and specificity for game activity data, using the processed hand count data, player count data, and other generated game activity data values.

In accordance with another aspect of embodiments described herein, systems, methods and devices may involve a game monitoring server device for monitoring game activities, including card and chip detection, hand counting, player counting, and so on.

In accordance with another aspect of embodiments described herein, systems, methods and devices may various card games. For example, In accordance with another aspect of embodiments described herein, systems, methods and devices may automate Caribbean Stud Poker so that the dealer would not need to press buttons.

In accordance with another aspect of embodiments described herein, systems, methods and devices may involve a peek hole currently used in card games. The location of the hand count device may be relevant particularly if cards are being placed tall or wide orientation into the peek hole. This way the card remains over the sensors. Accordingly, it may be convenient to install one or more sensors inside of the peek hole, or into a chip tray mounted peek hole to get around the above noted limitation.

In accordance with another aspect of embodiments described herein, systems, methods and devices may modify the hand count device to read cards from below. This may eliminate the need for a peek hole sensor because lights could be added to indicate if the hand count saw a blackjack, or other card configuration.

Referring now to FIG. 1 there is shown a system 10 for monitoring game activities (e.g., betting, playing, folding, dealer hand clearing, pocketing, suspicious activities) at gaming tables (e.g., poker, Blackjack, Baccarat, Pai Gow). The system includes a game monitoring server device 20 and one or more client hardware devices 30 (1 to N) integrated with gaming tables.

The system 10 may be configured to detect various characteristics relating to gaming activities, such as each new round of play, the value of each player's bet, and/or the end of each round. Various other information may be tracked relating to player and/or dealer movements and/or actions. Dealer performance and/or protocols can be tracked and/or managed (e.g., automatically), and the information captured by system 10 may be used by other purposes, such as being used for dealer scheduling and evaluation.

Integration may be, for example, with table management software such as Table Trac™, or various other types of table management systems. The system 10 records relevant data that may be utilized for reporting amounts wagered by each player. This captured data can be used for other applications such as player tracking, win amount determination, baccarat commission calculation, side betting and progressive betting, as well as rating a dealer's performance.

The game monitoring server device 20 is configured to aggregate game activity data received from client hardware devices 30, and transmits commands and data to client hardware devices 30 and other connected devices. The game monitoring server device 20 processes and transforms the game activity data from various client hardware devices 30 to implement hand counts and other statistical analysis.

Each client hardware device 30 may be linked to a particular gaming table and monitor game activities at the gaming table. A gaming table may be retrofit to integrate with the client hardware device 30 (e.g., an over the felt, under the felt, or other type of retrofit), or the client hardware device 30 may be provided integral with and/or residing within the gaming table. The client hardware device 30 includes sensors to detect game activities, gestures, motions, cards and/or chips. For example, sensors may be provided for monitoring card game activities, wherein the card game activities comprise hand count events, and wherein each client hardware device is configured to detect the hand count events and generate hand count event data (e.g., hand stop, hand start, suspicious hand, dealer error, number of hands) in response.

These sensors may also be configured to detect symbolic hand gestures by players and/or dealers (e.g., hand gestures used to indicate to cameras and/or other sensors that the dealer has not pocketed a chip, otherwise known as hand "clearing" hand gestures), and to also indicate the quality and/or adherence of such gestures in relation to a reference and/or signature gesture. For example, a hand clearing event may require the showing of open palms upwards, downwards, and may need to be conducted whenever a dealer starts dealing, ends dealing, touches a pocket, touches a body part (e.g., to scratch an itch)

For example, the tracked hand count data may include one or more characteristics related to the performance of the symbolic hand gestures; the one or more characteristics indicative of (i) whether the symbolic hand gestures were performed in association with the gaming hand (e.g., did the dealer clear his/her hands during the playing of a hand or a round of betting? Was the clearing of hands so that the dealer could scratch an itch or was it performed before/after a hand was played or before/after the dealer joined/left the table?); and (ii) if the symbolic gestures were performed in association with the gambling hand, a quality score (e.g., indicative of electronically estimated compliance with steps, quality of movements, successfully recorded and/or processed gestures) associated with performance of the symbolic hand gestures.

In a specific example, the sensors may track, in relation to symbolic hand gestures, whether (1) the dealer clapped, (2) the dealer showed the tops of the dealer's hands, (3) showed the bottom of the dealer's hands. The symbolic hand gestures may be tracked, for example, by tracking positions of visible fingers (e.g., fingertips, phalanxes), palms (e.g., a midpoint), knuckles, wrists, forearms, etc., and characteristics, such as speed of movements, completeness of movements (e.g., are the palms fully facing upwards or only at an angle?) may be tracked. Specific points may be tracked, or diffuse areas may also be tracked (e.g., defined by a set of points). In some embodiments, the sensory information is pre-processed in relation to extracting a subset of data points from the full set of photographic information. The sensors and cameras may track or detect the location of the dealer's hands. For example, if the sensors or cameras detect that there are no objects in a defined space then any detected movement may be presumed to be dealer's hands. The system tracks the dealer's hands relative to the cameras in some embodiments to determine locations of the dealer's hands and detect hand count events.

As will be described herein, FIGS. 12-19 provide schematics of an example client hardware device 30 that may be mounted on a gaming table to generate game activity event data. In some embodiments, the client hardware device 30 provides tracking for various profile association and/or login features (e.g., a 'Swipe' or 'tap' login feature that allows a player with a player card to sign in to a seat at a table to collect rewards).

The system 10 may also include a front end interface 80 to transmit processed game activity data, and receive game event requests. The system 10 may also include a hand count utility device 40 connecting the client hardware devices 30 to the game monitoring server device 20. The hand count utility device 40 may act as a hub and aggregate, pre-process, normalize or otherwise transform the game activity data. In some embodiments, the hand count utility device 40 may relay data. The front end interface 80 may provide various metrics and analytics, such as exact bet and hand count value for each player on Blackjack and Baccarat tables; dealer performance and comparison to other dealers for metrics such as hand count performance and number of hands dealt per hour; and the amount of money wagered by each player, including highest, lowest, and bet trends per visit, among others.

The system 10 may also integrate with one or more third party systems 50 for data exchange. For example, a third party system 50 may collect dealer monitoring data which may be integrated with the hand count data generated by game monitoring server device 20.

Figure 2:
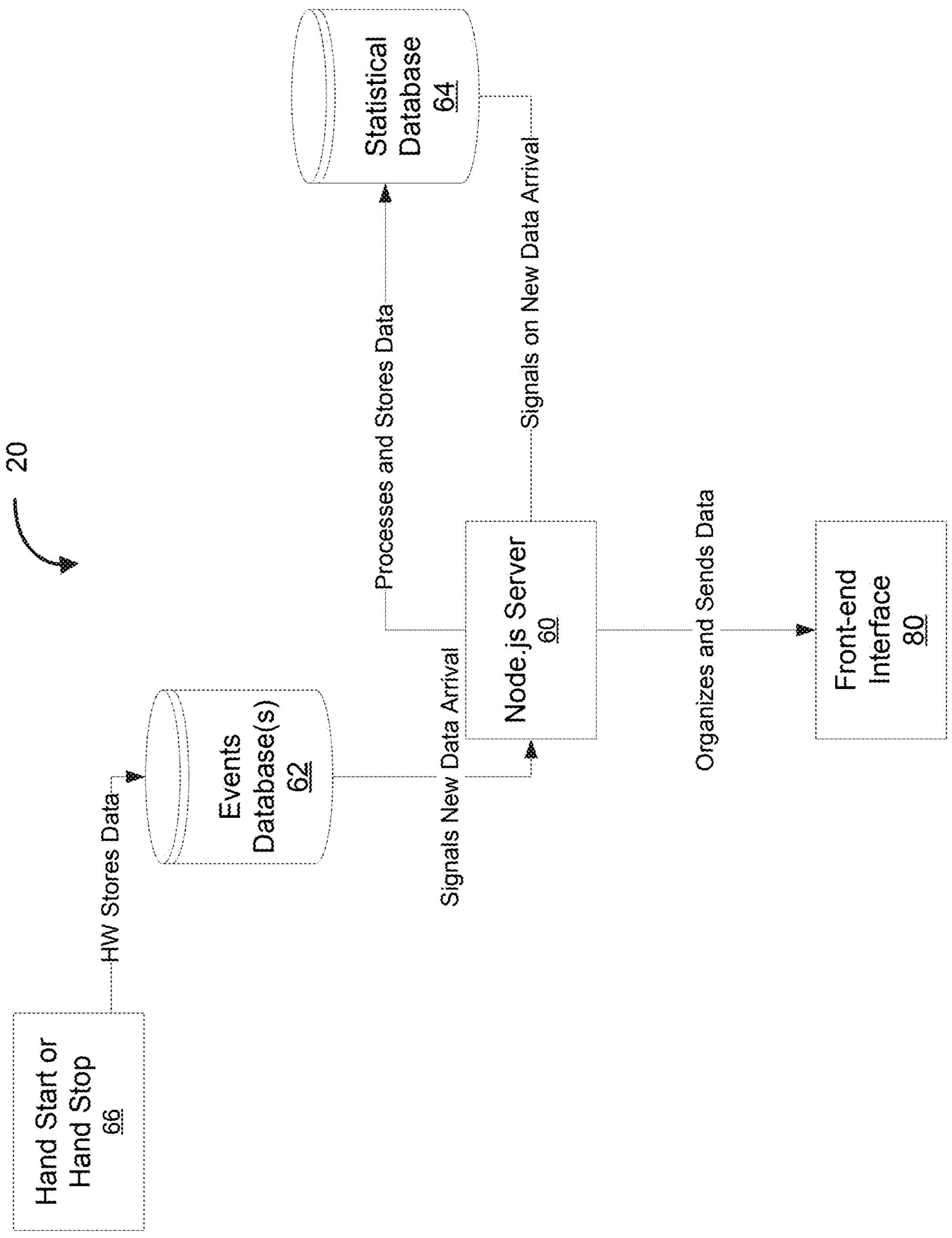
FIG. 2 illustrates a block diagram of a game monitoring server device, according to some embodiments.

Referring now to FIG. 2 there is shown an example game monitoring server device 20 according to some embodiments. The game monitoring server device 20 is configured to monitor game activities by collecting and processing game event data to detect and count player hands. On the back-end side, a node server device 60 for the interface of the game monitoring server device 20 subscribes to game event data. The game event data is written by the hardware to an events database 62. The game event data may be received via the client hardware devices 30 (FIG. 1) at gaming tables.

Game event data includes hand start data and hand stop data, which may be referred to generally as hand event data 66. The hand event data 66 may be used to determine a hand count (e.g., the number of hands played by various players) for a particular gaming table for a particular period of time. The hand event data 66 is processed and transformed by game monitoring server device 20 to generate hand count data. As hand start event data arrives at the events database 62, the node server device 60 determines and stores the start time and a table identifier (e.g., an identifier to identify the particular gaming table associated with the game event data) of the hand being played in a data structure for the hand start event. Accordingly, hand event data 66 may be associated with a time stamp (e.g., start time, stop time, current time) and table identifier. The hand event data 66 may also be associated with a particular player (e.g., dealer, customer, and a player identifier may also be stored in the data structure 62. The node server device 60 waits for hand stop event data to be received from the client hardware device 30 at the gaming table where the hand started. Once the hand stop event data arrives at the event database 62, the node server device 60 generates hand count data. The hand count data may include a counter that increments each time a pair of hand start/hand stop data is received. The hand count data may be a data array of hand start/hand stop data values that may be matched using the timestamps and table identifier. The hand count data may be used to determine an estimated hand count including an estimated hands per hour value. The estimated hand count may be linked to a particular table, group of tables, player, geographic location, and so on. The node server device 60 may also calculate the hand duration for each hand count detected. Accordingly, the hand count data may further included the estimated hand duration. The hand count data and other game event data is sent to the statistical database 64 for the future retrieval, processing and transmission.

Where the game monitoring server device 20 is also configured to track symbolic hand gestures, game event data and/or hand event data 66 may include, for example, photographic frames and/or information automatically extracted from photographic frames, each one of the one or more photographic frames capturing one or more positions of body parts of the human dealer at a corresponding point in time during the performance of the symbolic hand gestures. The extracted information, for example, may be processed from photographic frames and/or compressed thereon so that there may be a reduction in bandwidth resources required while maintaining some level of accuracy relating to the detection and/or characterization of symbolic hand gestures (e.g., transmitting photographic frames may be quite processor/bandwidth intensive so some embodiments may include the transfer only of processed indicia and/or characteristics relevant to various downstream analyses).

As an example, the game monitoring sever device 20, in conjunction with client hardware device 30, may be configured to automatically determine whether the performance of the symbolic hand gestures has been initiated by tracking gestures on one or more sensors; and upon determining that the performance of the symbolic hand gestures has been initiated, generate a start hand gesture time stamp indicative when the performance of the symbolic hand gestures was initiated. Optionally, the client hardware device 30 may automatically extract position data associated with the one or more positions of the body parts of the human dealer from the one or more photographic data frames generated by the one or more sensors during the performance of the symbolic hand gestures (e.g., by tracking the movements of principal joints and/or body parts) and transform the extracted position data into the quality score associated with the performance of the symbolic hand gestures.

The client hardware device 30 may also automatically determine that the performance of the symbolic hand gestures has ceased; and upon determining that the performance of the symbolic hand gestures has ceased, generate an end hand gesture time stamp indicative when the performance of the symbolic hand gestures has ceased.

Various aspects of information may be provided to the game monitoring server 20, for example, as part of the hand count data, (i) the start hand gesture time stamp, (ii) the end hand gesture time stamp, and (iii) the quality score. This information (or electronic indicia processed therefrom) can be used for various purposes, such as including in notifications regarding dealer performance, the automatic provisioning and/or generation of control signals, the control signals indicative of when a dealer should be removed, investigated, alternated out, where the dealer fails to meet compliance standards (e.g., a pre-set threshold of average quality) in one or across multiple hands. For example, a dealer may be particularly deficient at hand clearing and/or in some embodiments, fail to perform a hand clearing before touching a body part (e.g., adjusting a tie, scratching an itch). The system may be configured to send a notification and/or an indication requesting that the dealer be removed and/or investigated for theft.

By having the software perform multiple and/or different scans of the betting areas, the system is designed with checks and balances in place to ensure that there are no errors in reporting player bet values. The ability to conduct a plurality of (e.g., multiple) layers of redundant checks, along with the ability to cross-reference, correlate and/or automatically determine patterns and/or trends may aid in both (1) identifying errors and (2) determining the root cause of the errors so that the errors can be resolved in a responsive manner.

Further, computer-aided implementation aids in the facilitation of such analysis, as the amount of information received may be overwhelming and/or contain myriad interrelationships which are not readily apparent to the human eye. Significant resources may be saved by not requiring the presence of human observers watching camera systems, and further, more reproducible and accurate data may be achieved.

Nonetheless, computational resources are finite and an effective system may require operation within the bounds of available computational resources (e.g., processing power, memory, storage, redundancies, network bandwidth). As described throughout this specification, there may be various approaches, including gesture recognition techniques, which aid in reducing the computational burden on processors by advantageously utilizing approaches such as principal component analysis and/or principal joint variable analysis to actively reduce the amount of data and/or information that is required to communicate various analyses. Each additional element of information tracked may cause a corresponding increase in analytical complexity, and these approaches aid in reducing the burden such that the system may be able to accurately provide information in an In some embodiments, client hardware devices 30 may also be configured to perform activities in relation to a TITO (Ticket In Ticket Out) recognition technology that may facilitate the ability for players to perform various tasks automatically (e.g., buy-ins, associating play with an account, requesting a rebate) at a table using, for example, signals and/or indicators of their intention (e.g., using their clot tickets by simply holding their TITO over the bet area of a table). The TITO technology may be realized in various ways, such as using near field communications, visual information captured by a camera, player hand signals, and documents with scan-able and/or computer-readable media, such as barcodes, QR codes, symbols, etc. As a non-limiting example, a camera may be installed into a chip tray, which scans a TITO barcode and receives a confirmation from the venue's TITO system, validating the ticket before allowing the dealer to exchange it with the venue's chips.

Figure 3:
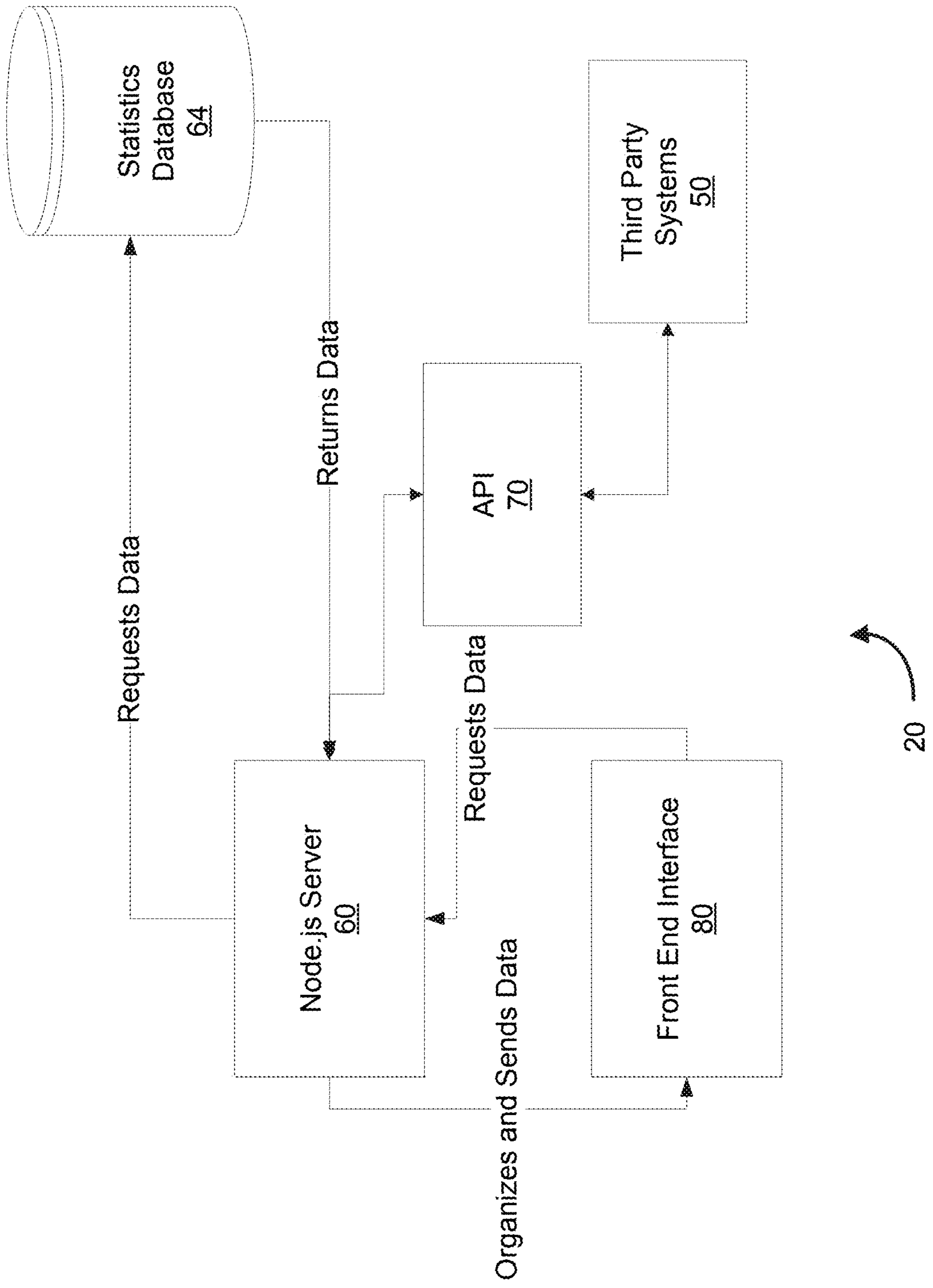
FIG. 3 illustrates a block diagram of another game monitoring server device, according to some embodiments.
Figure 4:
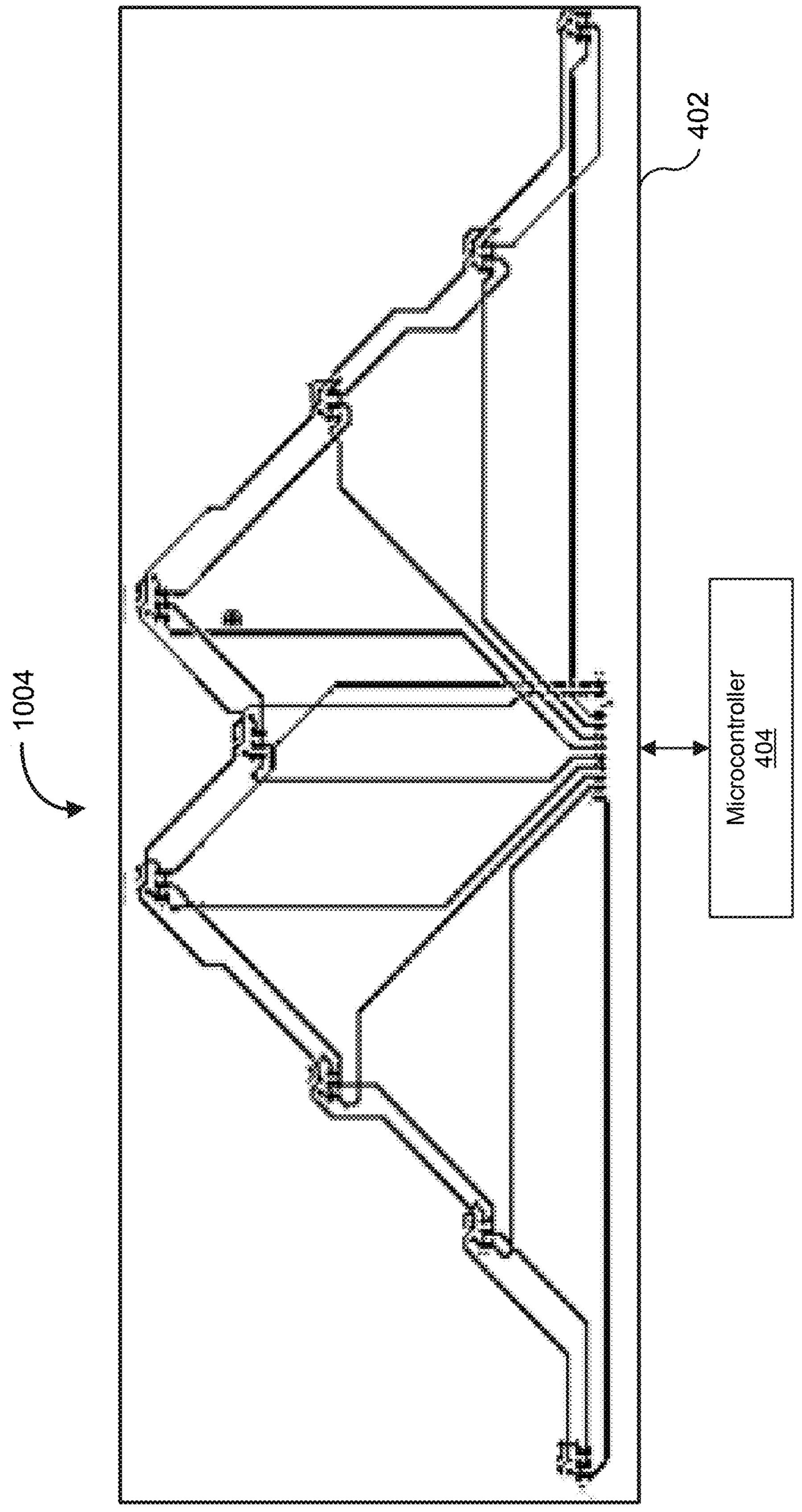
FIGS. 4 to 7 illustrate various example hardware configurations of client hardware devices, according to some embodiments.
Figure 5:
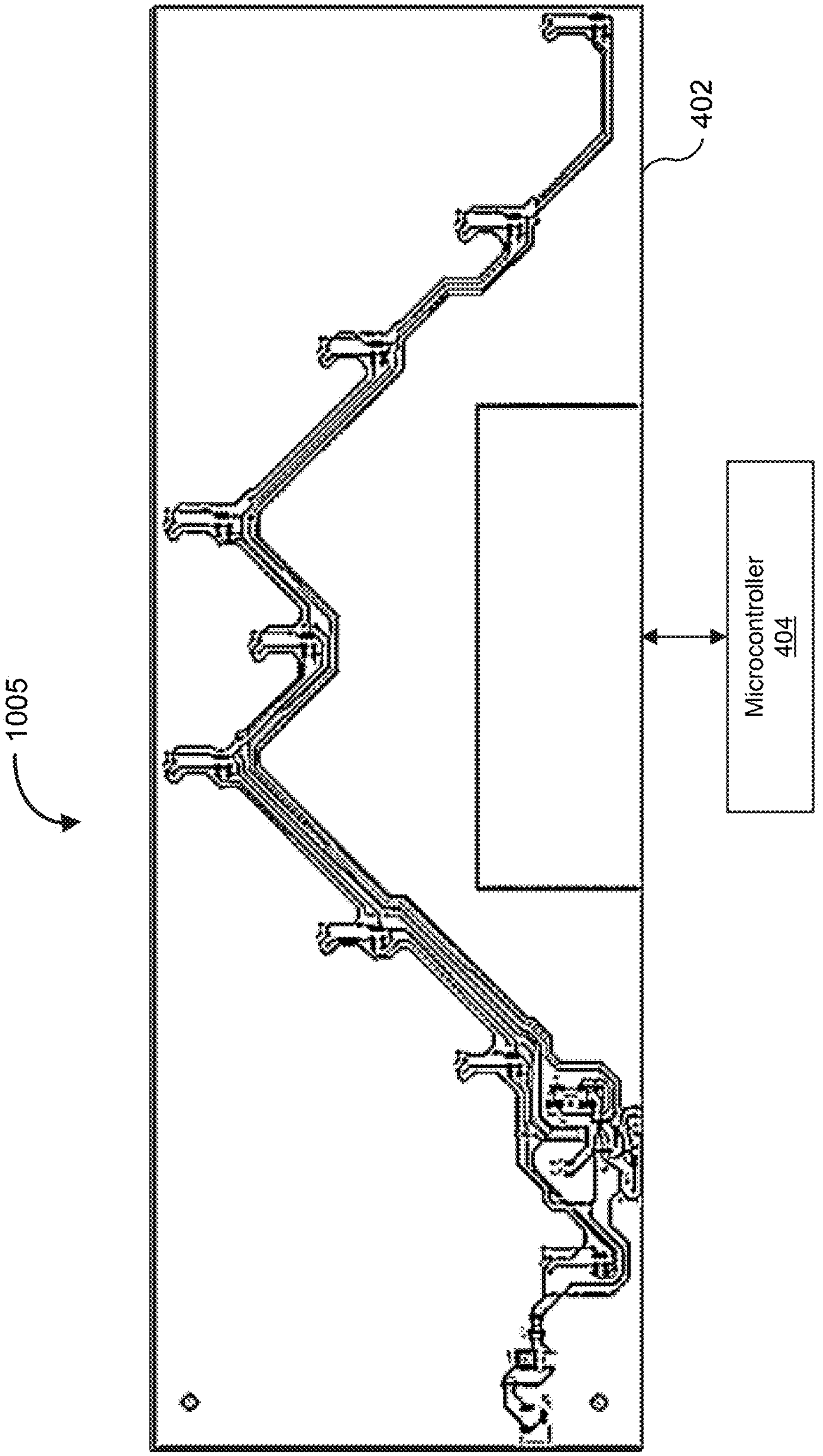
Figure 6:
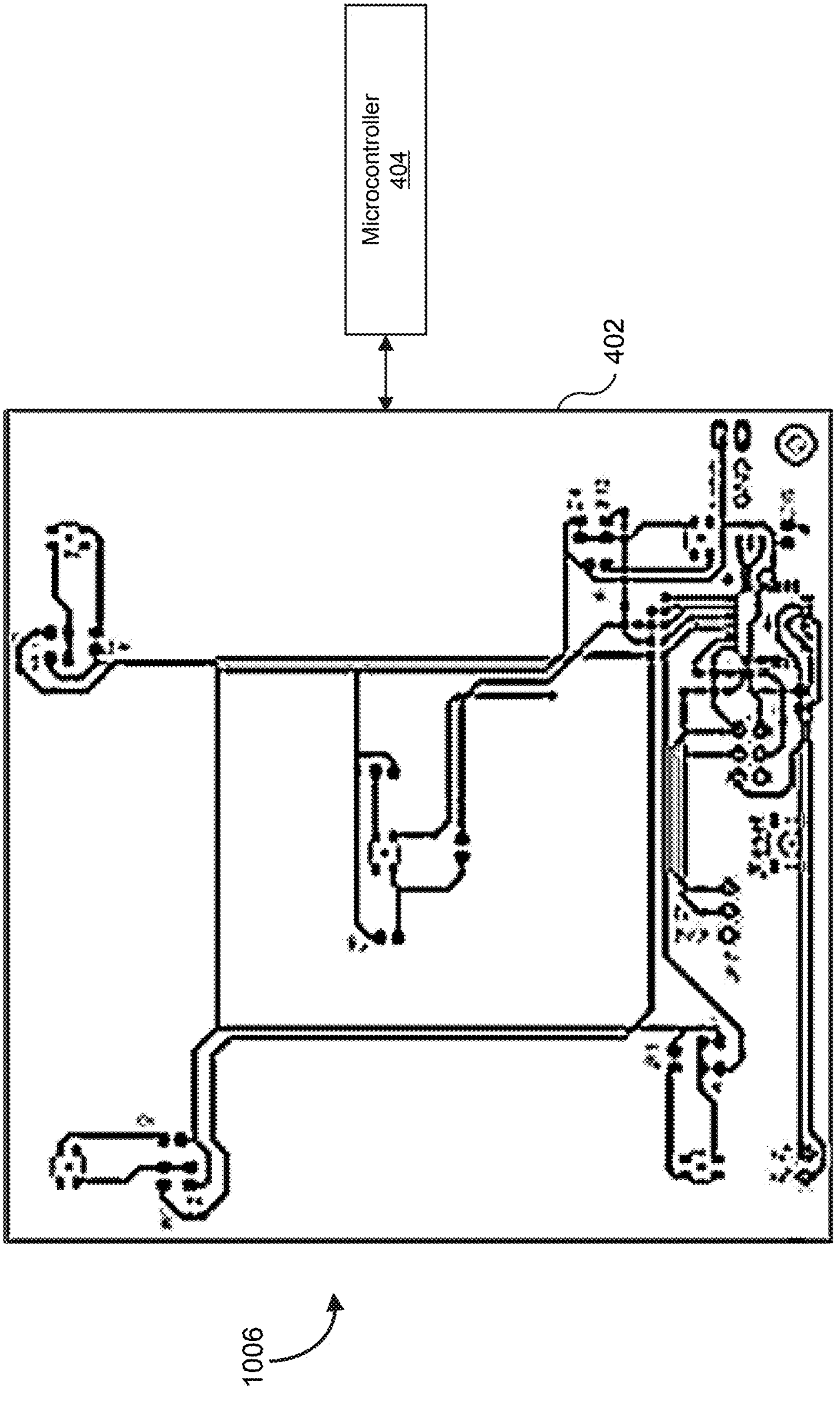

Referring now to FIG. 3 there is shown another example game monitoring server device 20 according to some embodiments. On the front-end side, the node server device 60 subscribes to the statistics database 64. When new hand-played data arrives at the statistics database 64, the statistics database 64 may inform user devices of the newly arrived hand-played data by transmitting and displaying a notification message on an interface display screen via front-end interface device 80. An API server 70 may connect to and integrate with various third party systems 50.

The front-end interface device 80 may provide an interface to game monitoring server device 20 for end user devices and third-party systems 50. The front-end interface device 80 may generate, assemble and transmit interface screens as web-based configuration for cross-platform access. An example implementation may utilize Socket.io for fast data access and real-time data updates.

The front-end interface device 80 may assemble and generate a computing interface (e.g., a web-based interface). A user can use the computing interface to subscribe for real time game event data feeds for particular gaming tables, via front-end interface device 80. The interface may include a first webpage as a main dashboard where a user can see all the live gaming tables and their game monitoring data in real time, or near real time. For example, the main dashboard page may display hand count data, player count data, dealer information, surveillance video image, and so on. Hand count data may include, for example, total average and hourly average of the hands per hour data for each gaming table in real time. The hand count data may include hand duration data, such as average duration for hands at a particular gaming table, longest duration, shortest duration, and so on. The display may be updated on each hand played to allow the user to see recent real-time data.

The interface may include a second webpage as a management page where management users can perform management related functions. For example, the interface may enable management users to assign dealers to inactive gaming tables or close live gaming tables. An on and off state of a gaming table may send a notification to all instances of the interface. If a user is on the monitor management page when a new gaming table is opened, the user may see the live gaming table updated on their display screen in real-time. The management page may also show surveillance images of each gaming table, and other collected data. The surveillance images may be used or triggered upon detection of particular patterns of hand count event data at a gaming table, for example.

The front-end interface device 80 (and interface generated thereby) may include a third webpage as a historical data webpage, which may display historical hands per hour data of a selected gaming table. It may allow the user to browse the historical data of hands per hour by providing a date range selecting control. The data may be organized hourly, daily, monthly, and so on depending on the range the user chooses. The data along with the hand duration and a theoretical earning coefficient may be used to estimate the net earnings of the gaming table over the selected date period.

In an embodiment, the front end interface 80 is a software interface that may be web-based, runs on various computing systems having various operating systems, integrates into a venue's existing table management software, and may be accessible on PC or mobile-based devices. The front end interface 80 facilities the ability for pit bosses to access to real time data on each player in their pit, among other uses. The interface 80 also provides a dashboard for arching bets and hand counts, as well as tools for generating reports and detecting anomalies.

The software interface offers "trend tools" that will allow the casino to analyze the data collected from its players and dealers, providing insights into patterns for dealer and player activities to help a casino's management to develop efficiencies and increase gaming revenues. For example, by generating and reviewing historical reports on 1) the number of players visiting a casino at different times of the day, 2) their wagering levels, and 3) the types of games they had played, the casino can optimize its dealer scheduling to minimize potential over-staffing.

A server and client model may be structured based on receiving and manipulating various sorts of game event data, such as hand count data, betting data, player data, dealer data, and so on. The interface may be expanded to process other types of game data such as average bets per hands on a table. The extra sets of game data can be displayed on the monitor or management page in an additional graph, for example. The date range selection tool may be used for analyzing the added data along with the hand count data. Similarly, the main dashboard may show real-time statistics of both the hand count data and the additional game data.

As an illustrative and non-limiting example, the following may be an outline of pseudo code in relation to generating and collecting hand count data.

```
while True:
    if ShoeIsEmpty ( )
        DoNothing ( )
        continue
```

```
for sensor in DealerSensors:
  if SensorIsBlocked (sensor):
    SendToServer ("Hand Started")
    #Set the Timer to finish in X seconds (e.g., 2)
    # The Timer's delay will be reset back to X
      seconds if sensor is still blocked
    SetTimerDelay (X seconds)
  if TimerDelayFinished ( )
    # If the sensor hasn't been blocked for X seconds
    SendToServer ("Hand Stopped")
```

Embodiments described herein involve particularly configured hardware. As an illustrative example, embodiments of devices for monitoring game activity may be implemented using three example components: a microcontroller, a sensor array network and connection cables.

The device, for example, may include a small computer unit installed under the table to capture the bet/hand/gesture imagery and send the data to a server for processing and archiving (e.g., on a database). The system 10 can utilize the casino's network for sending real time betting data to its table management software.

In an embodiment, the device may include a number (e.g., 3-5) of camera modules installed around the chip tray in front of the dealer (e.g., as an array of sensors), pointed directly at the bet areas. The system activates the camera modules when a hand count sensor hidden under the area in front of the dealer recognizes the start of a new hand. In this example, the hand count sensor may be a separate sensor than the camera modules. In another example, the camera modules may be utilized to determine a start of a new hand. The modules may be waterproof and built not to obstruct the existing tray locking covers.

The microcontroller may run the logic level code for checking onboard sensors (e.g., sensors integrated into the gaming tables via client hardware devices 30) for predefined thresholds triggering hand count event data. The microcontroller may also emulate a serial communication protocol for the host. The sensor array network may include interconnected sensors that can communicate with each other. The sensors may be integrated with a gaming table and positioned relative to playing area of the table. They may be all connected via the microcontroller and routed accordingly. A further component may be the connection cable to process the digital serial signal and allow the device to connect via USB or other protocol (e.g., wireless) to a computer with a free port. The data may be transmitted via the USB cable or other protocol and may be read by a small utility on the host computer. The microcontroller may include various communications buses to obtain sensory information in an efficient manner, and to route communications across limited communication resources.

FIGS. 4 to 7 illustrate various example hardware configurations including a microcontroller 404, a sensor array network 402 and connection cables. Each example hardware configuration may advantageously reduce or eliminate dead zones in sensor coverage that may result from various table configurations associated with different game area configurations (e.g., tables may be configured differently depending on the card game played). The figures so example PCB layouts for different examples of sensors positions. These are illustrative examples only to show that sensors may be placed in locations that generally are used for card activities and may cover different areas depending on the configurations.

Figure 7:
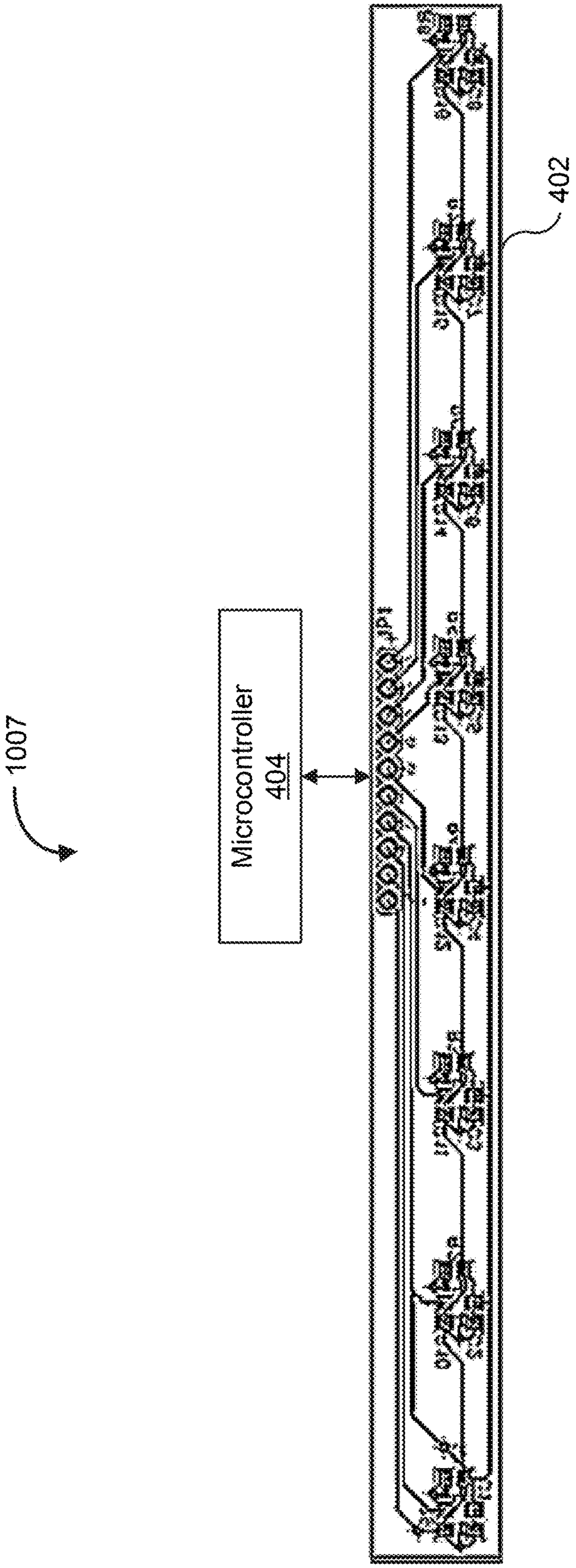

For example, the "strip" sensor configuration 1007 shown in FIG. 7 may advantageously reduce or eliminate dead zones relative to where the cards will be played or the need for peep holes (e.g., for blackjack). The strip configuration 1007 may enable cards to placed anywhere in the card placement area of the table and the sensor will detect the cards. Further, the strip sensor configuration 1007 shown in FIG. 7 may enable simple installation on a gaming table. One hole may be used for the entire sensor strip through the felt, foam and wood of the table, as compared to scattered sensors which may require individual holes to be cut into the gaming table. Generally the sensors are not placed under felt. However, if the felt was very thin then this may be appropriate to place sensors under without impacting their operation. It will be understood by persons skilled in the art that the hardware configurations provided in FIGS. 4 to 7 are exemplary and non limiting.

For a dealer hand count (as opposed to a player hand count which may be shown in FIG. 11) only two sensors may be required in some example embodiments with an indication via a light or light ring where the cards should be played.

Figure 8:
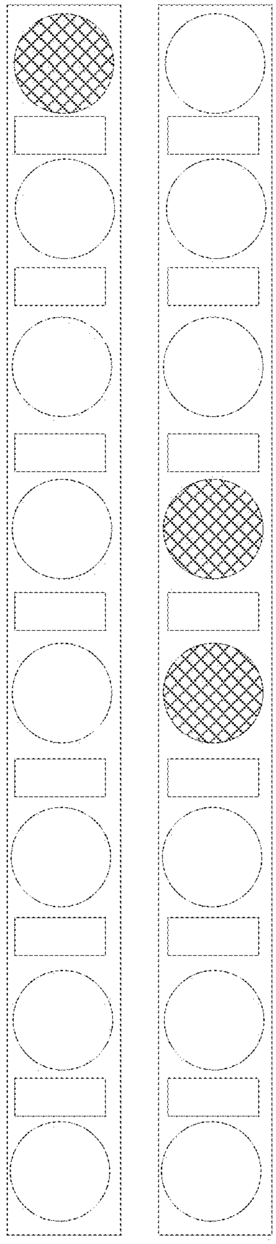
FIG. 8 illustrates sensor activation indicative of a single chip, according to some embodiments.
Figure 9:
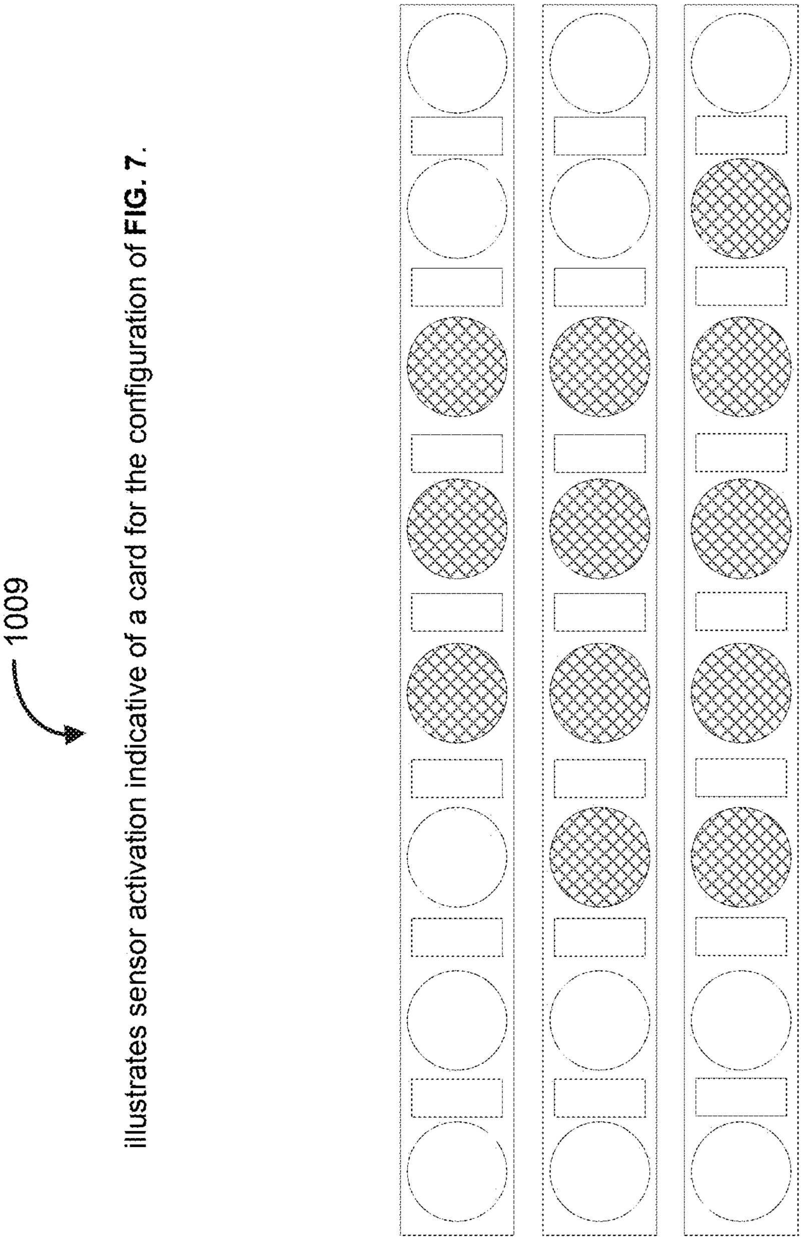
FIG. 9 illustrates sensor activation indicative of a card, according to some embodiments.

The sensor data may be used to distinguish between different types of game events at a gaming table. For example, a game event may be a hand start or hand stop event, and another event may be a betting or chip related event. FIG. 8 illustrates sensor activation indicative of a single chip for the configuration of FIG. 7. FIG. 9 illustrates sensor activation indicative of a card for the configuration of FIG. 7. The sensor data may be used to distinguish between different types of game events at a gaming table. For example, a game event may be a hand start or hand stop event, and another event may be a betting or chip related event.

Figure 10:
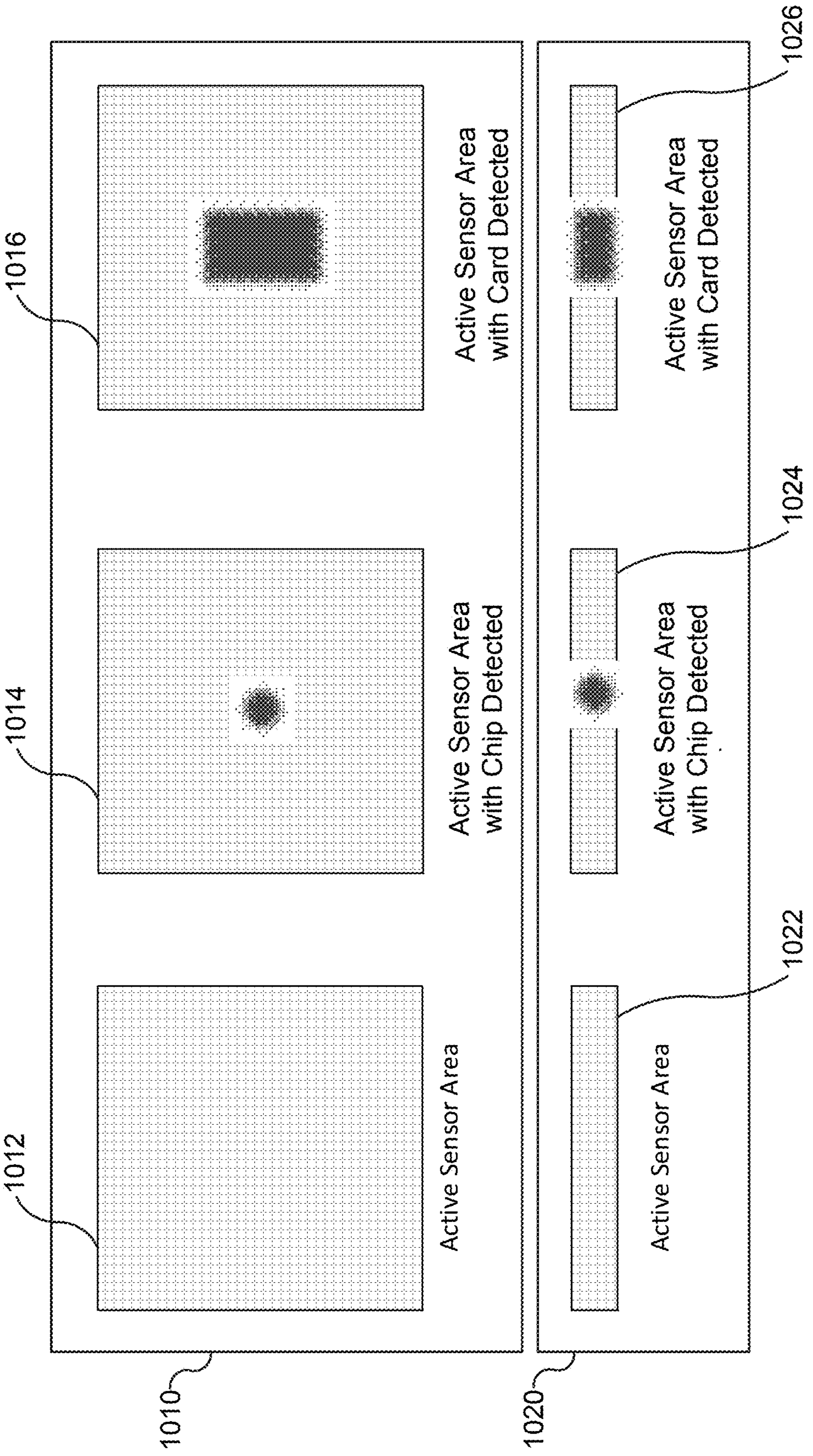
FIG. 10 illustrates a schematic diagram of two illustrative example embodiments of active sensor areas for a gaming table.

FIG. 10 illustrates a schematic diagram of two illustrative example embodiments of active sensor areas for a gaming table. The first example embodiment 1010 illustrates an active sensor area with no object detected 1012, an active sensor area with one or more chips detected 1014, and an active sensor area with a card detected 1016. The second example embodiment 1020 similarly illustrates an active sensor area with no object detected 1022, an active sensor area with one or more chips detected 1024, and an active sensor area with a card detected 1026.

Figure 11:
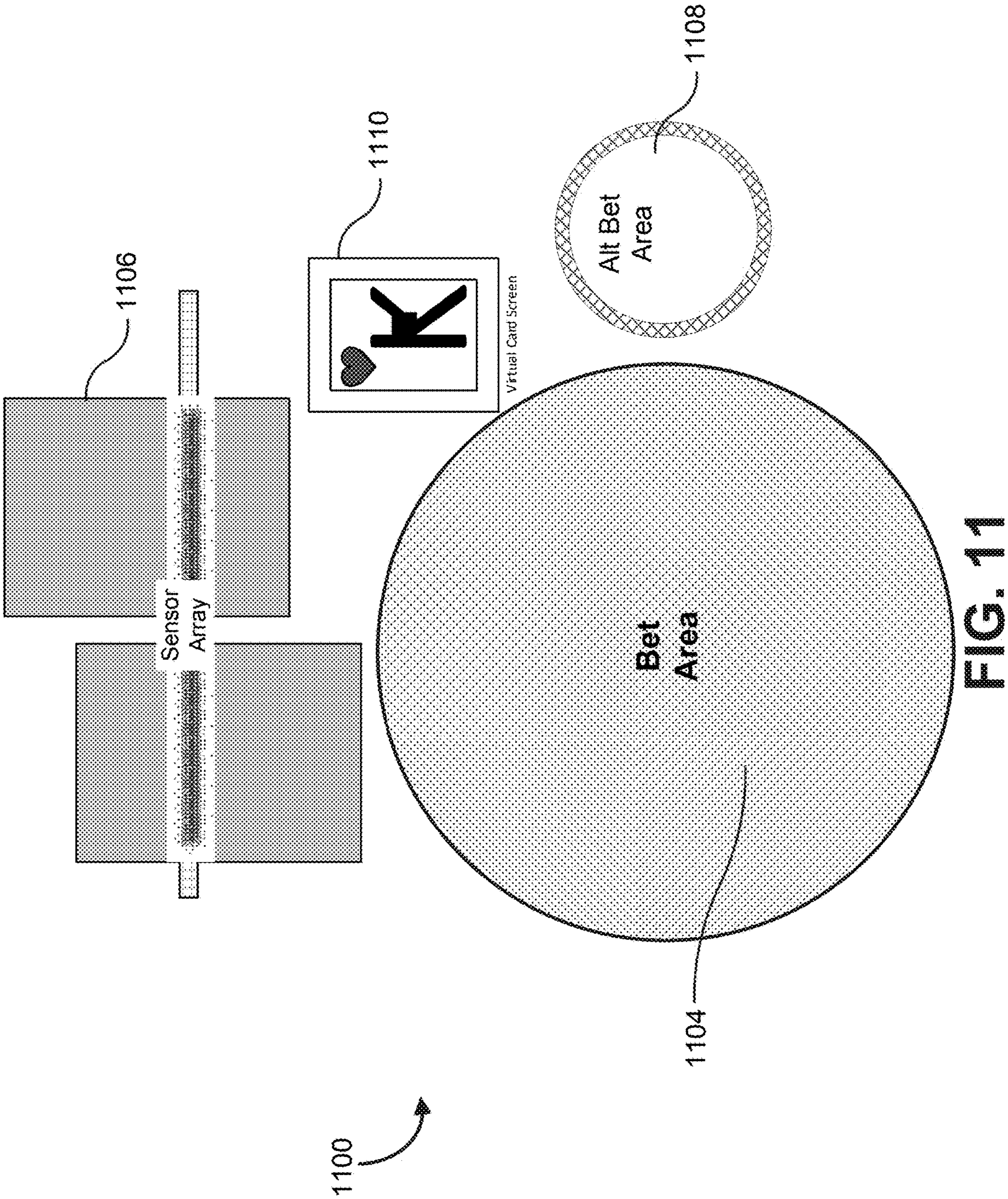
FIG. 11 illustrates a schematic diagram of a gaming table, according to some embodiments.

FIG. 11 illustrates a schematic diagram of a gaming table 1102. The gaming table includes a player bet area 1104 (which may be associated with a sensor array 1106), and a player hand count area at the top through an illustrative example sensor array 1106. The gaming table 1102 also includes alternative bet area 1108 with bet recognition sensor and illumination for confirmation and rewards. The gaming table may further include a virtual card screen 1110 that functions as a display screen.

Referring now to FIGS. 12 to 18 there is shown exploded schematic diagrams of a device for monitoring game activities in accordance with embodiments described herein. The device for monitoring game activities may be a client hardware device 30 (FIG. 1). The client hardware device 30 may be mounted or integrated into a gaming table to monitor game activities, including hand events. That is, the client hardware device 30 may be configured to generate game event data for processing player hand counts. The client hardware device 30 (e.g., hand count device) may be installed into a gaming table to retrofit the gaming table with game monitoring capabilities. As an illustrative example, a bracket 1210 may be screwed into the gaming table under a felt top of the table and over foam of the table. The client hardware device 30 may be screwed into the bracket and may go over top of the felt and foam. This configuration may enable a cost effective retrofit, while providing a smooth playing area that does not catch on cards or chips. The client hardware device may include one or more sensors for detecting cards, chips and other objects. The client hardware device 30 may further include scales which may be used to identify the objects detected by the sensors, and may be used to determine a number of objects detected by the sensors, such as a number of cards or a number of chips in a stack of chips, for example.

Figure 12:
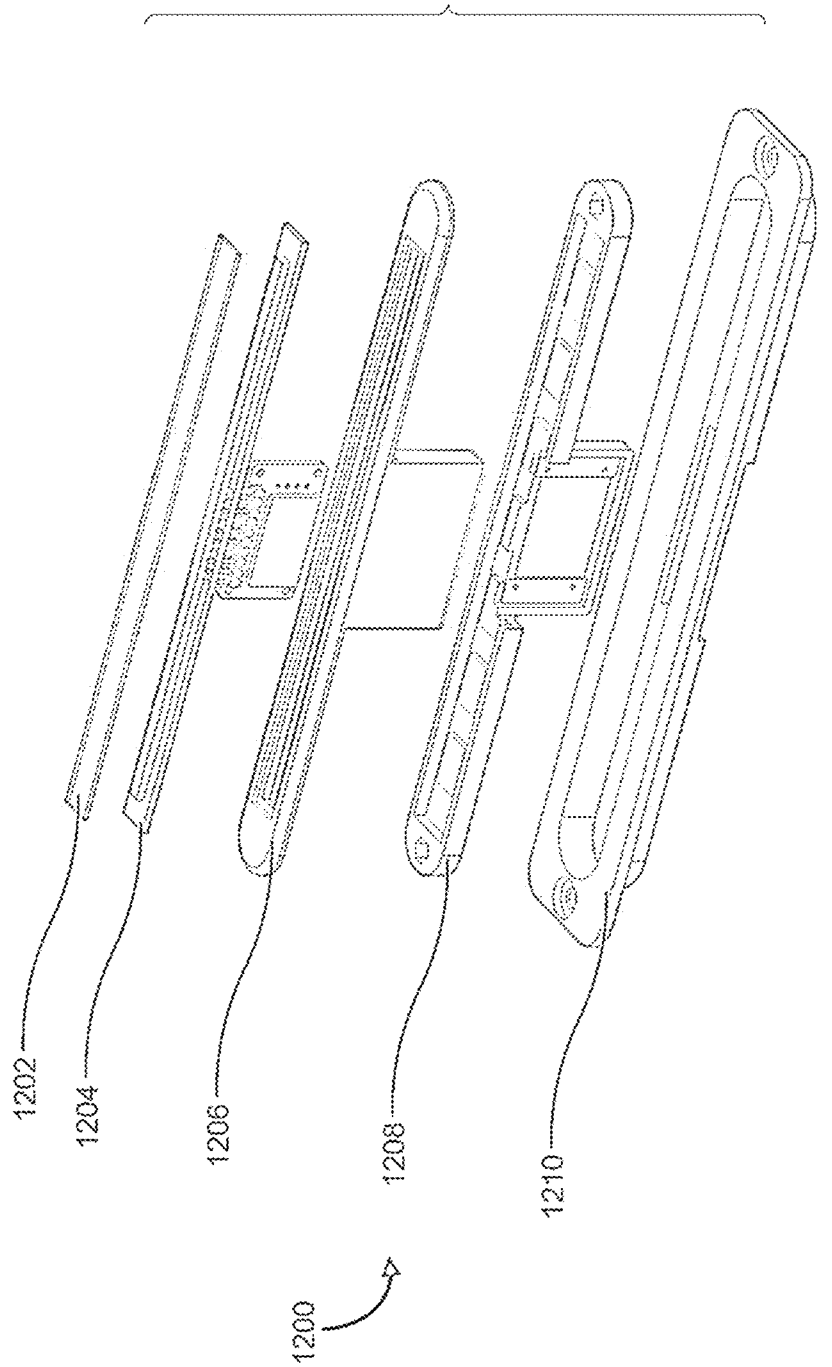
FIGS. 12-18 illustrate schematics of an example client hardware device that may be mounted on a gaming table to generate game activity event data, according to some embodiments.
Figure 13:
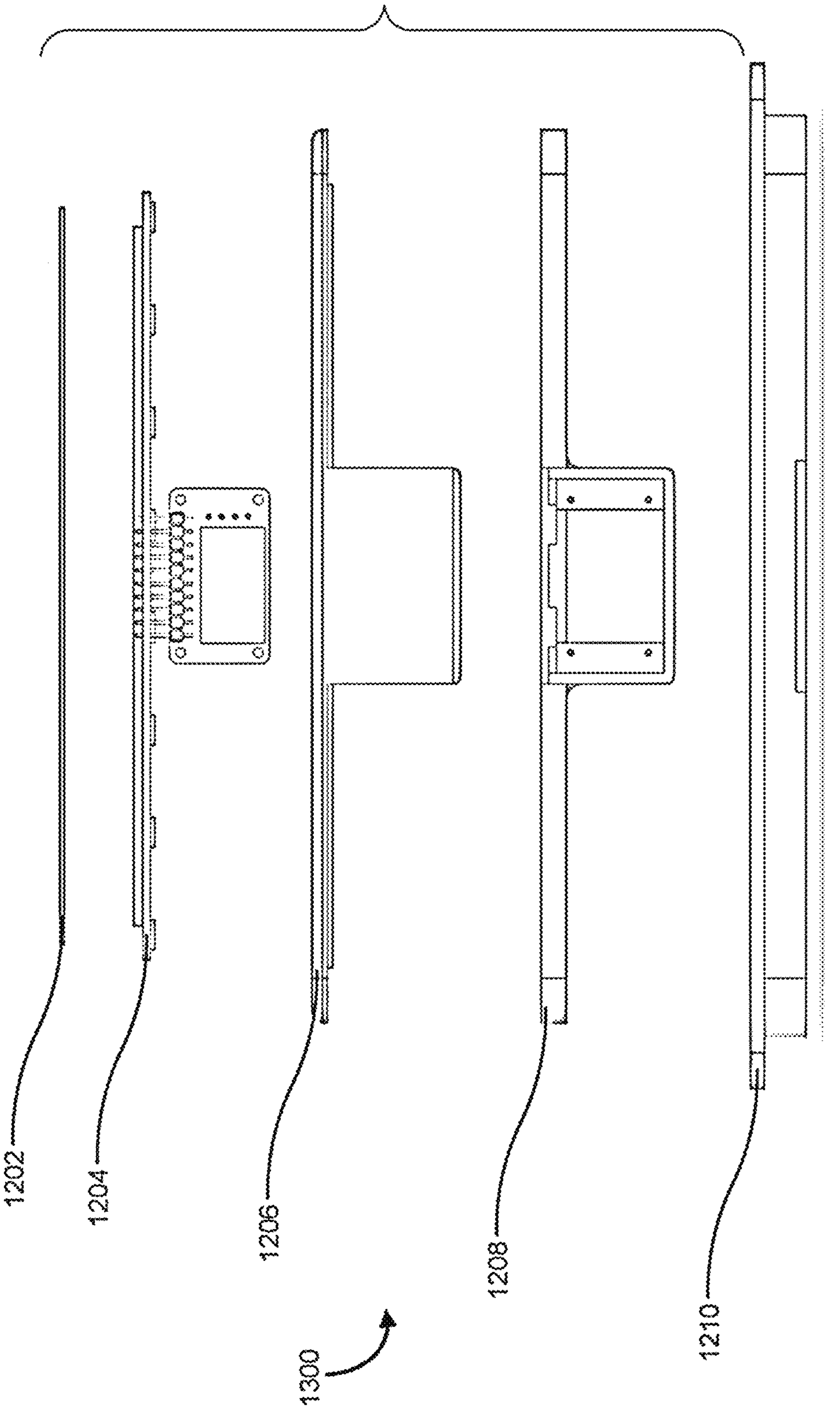
Figure 14:
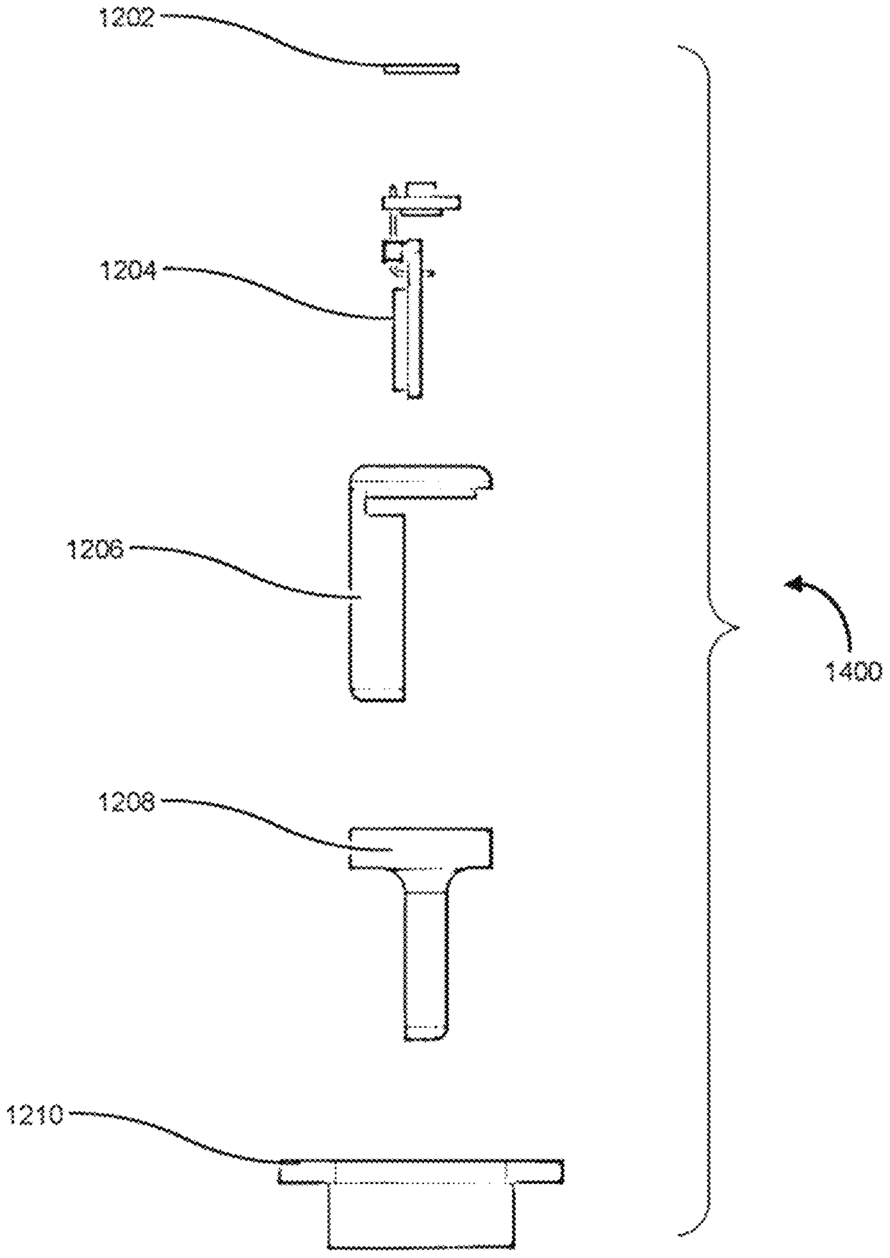
Figure 15:
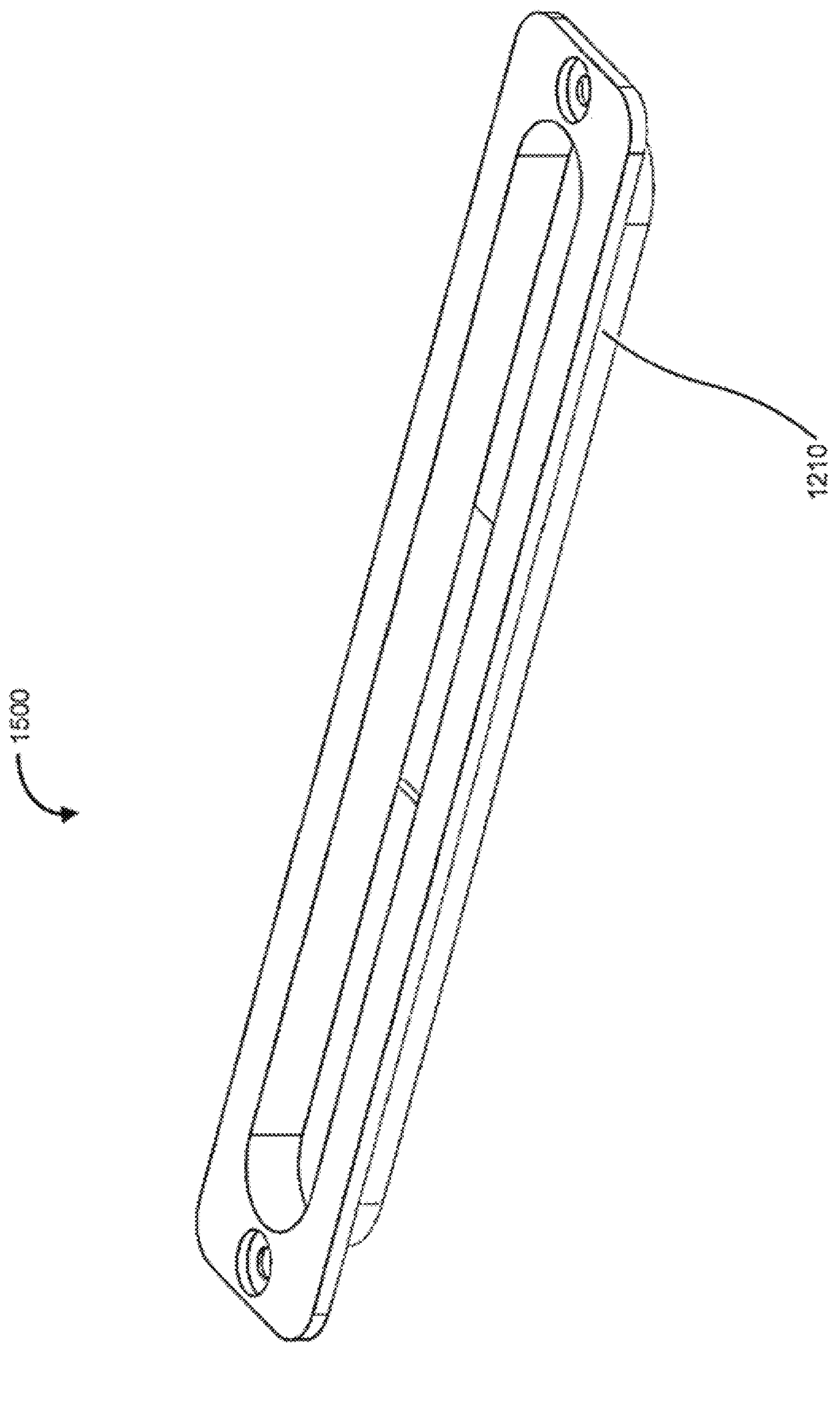
Figure 16:
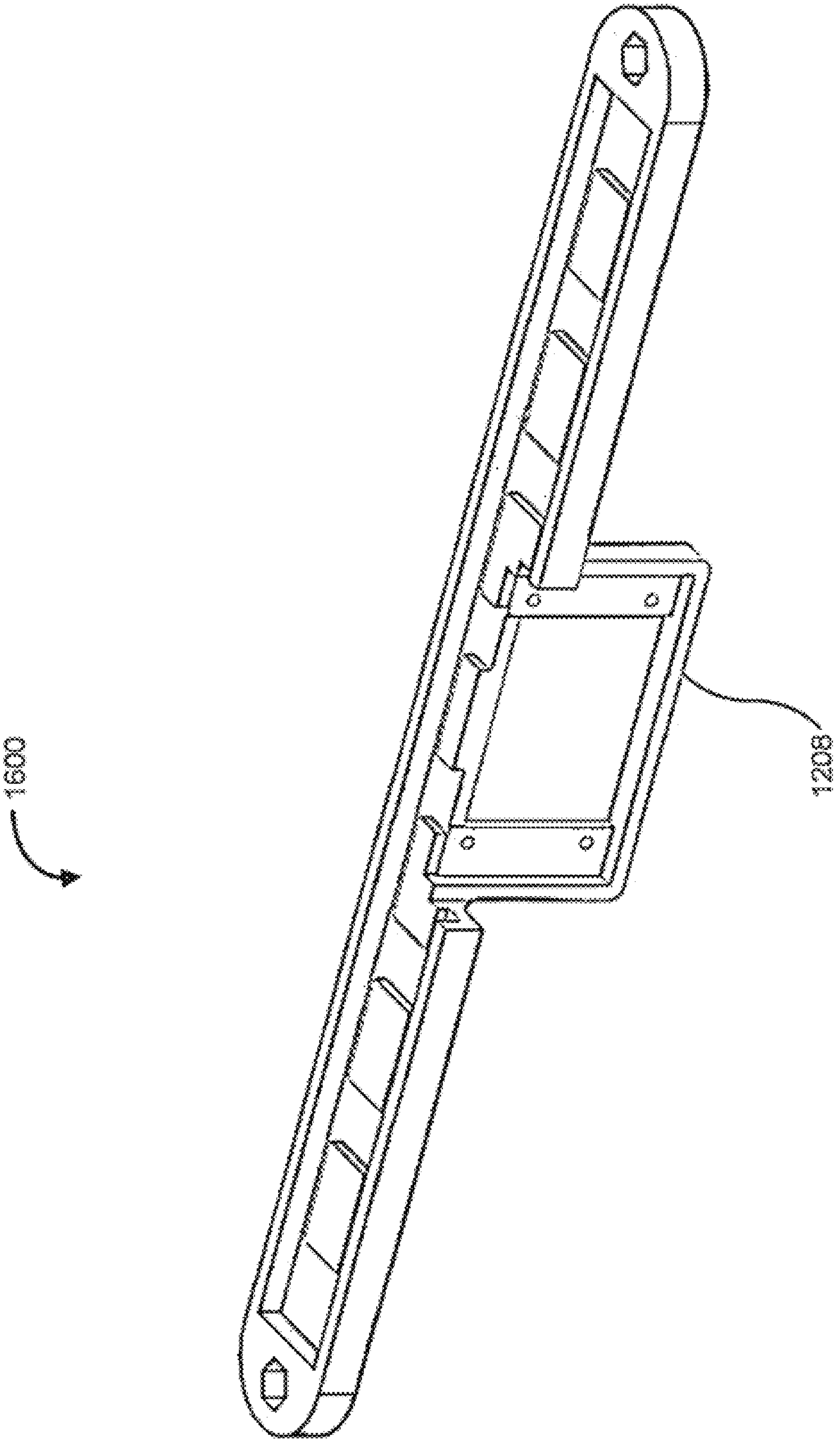
Figure 17:
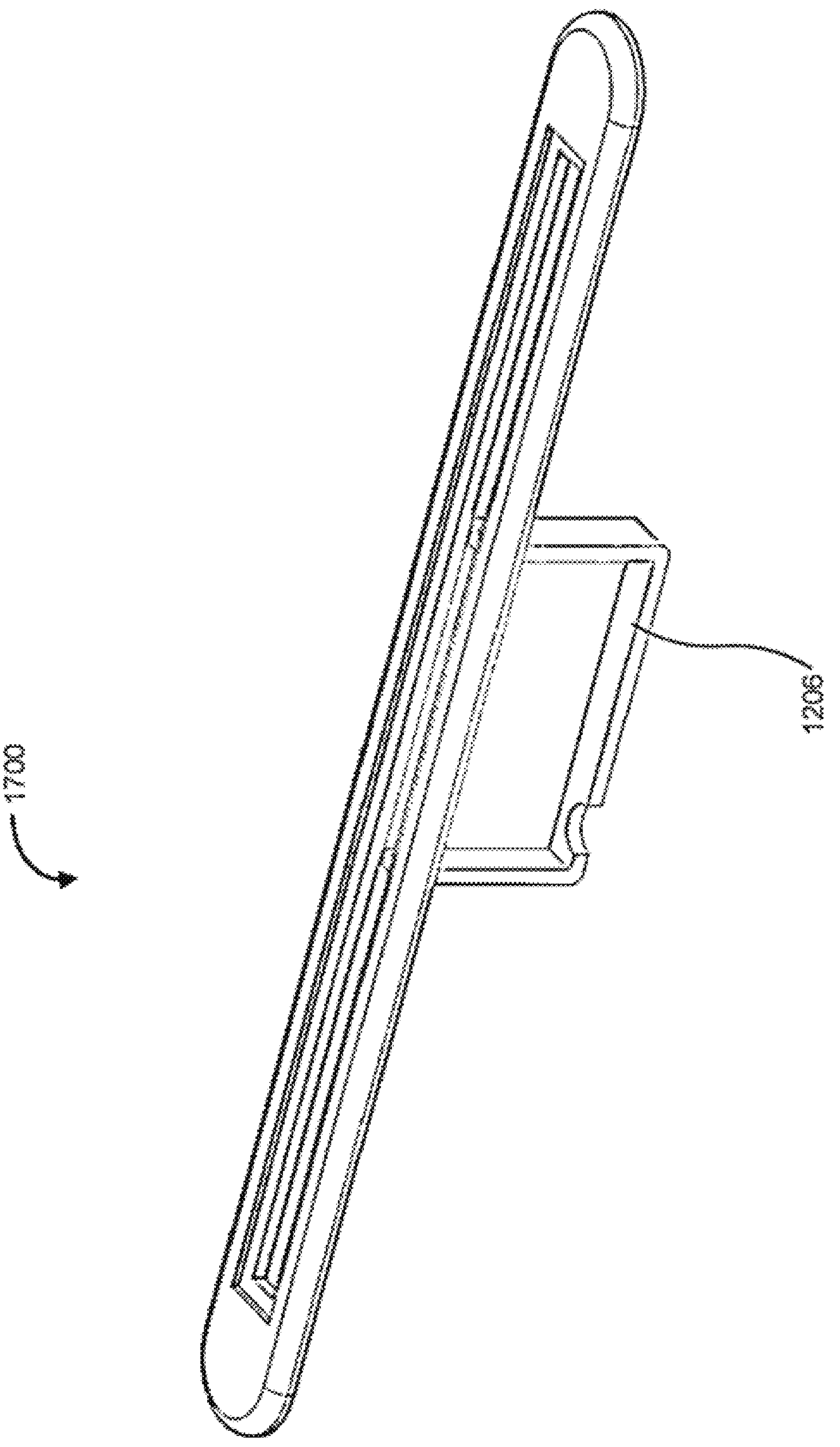
Figure 18:
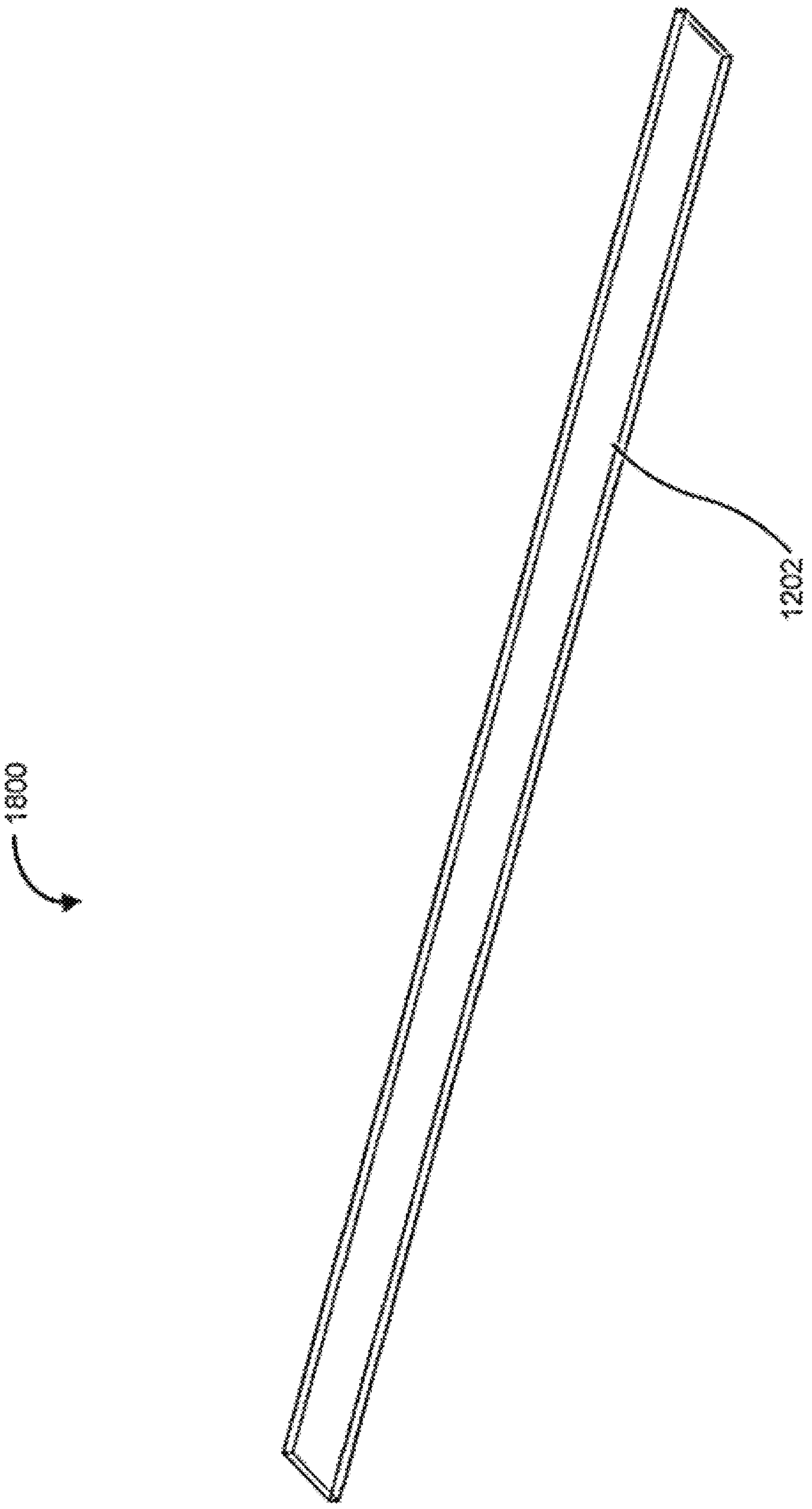
Figure 19:
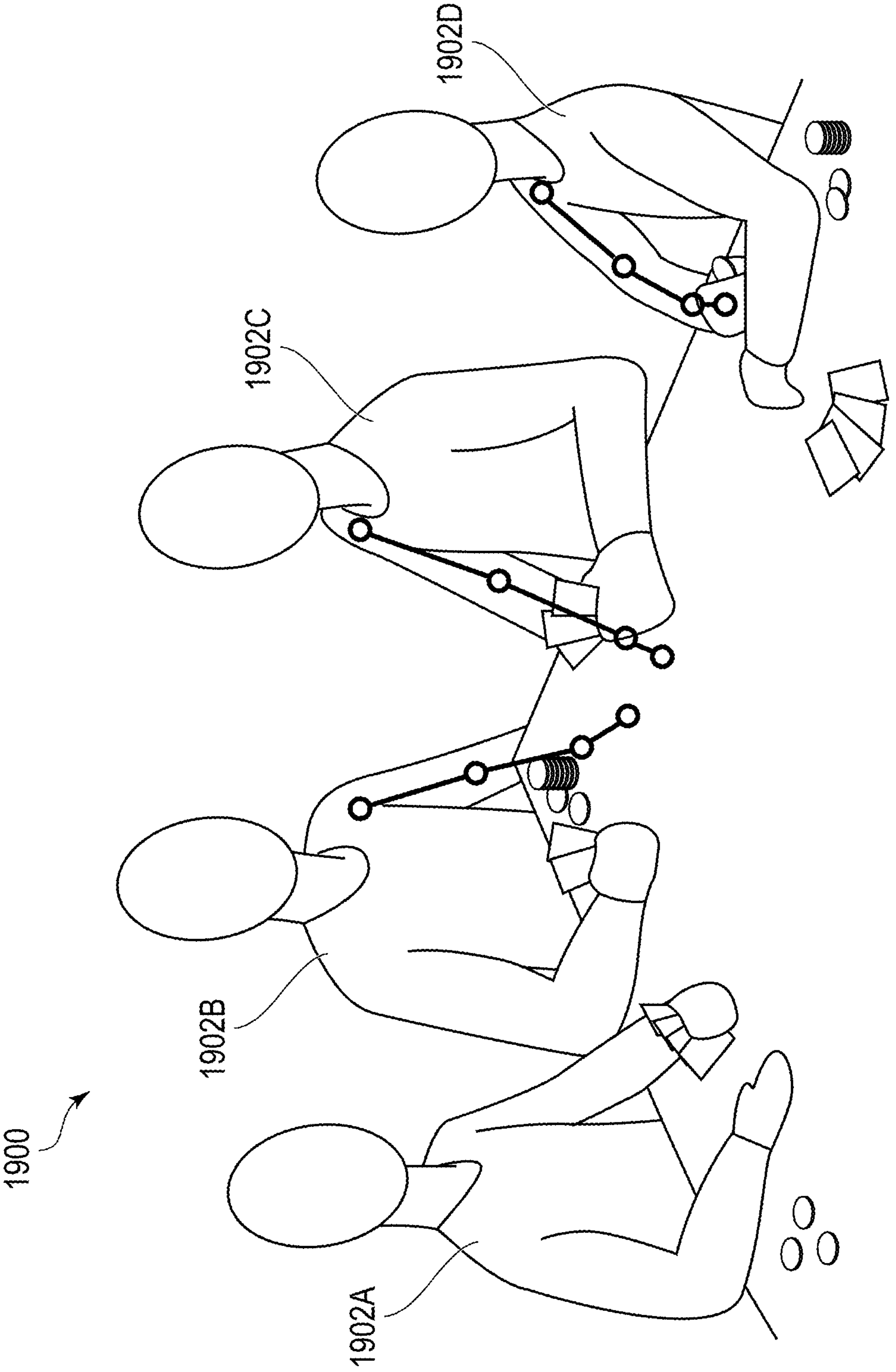
FIG. 19 is an illustration of an embodiment of a frame of data captured by a camera detector filming a casino gaming table, according to some embodiments.

FIG. 12 provides a perspective view of an exploded schematic diagram of a device for monitoring game activities in accordance with embodiments described herein. The device may include a protective cover 1202, a PCB with sensor components 1204, cases 1206, 1208, and a mounting bracket 1210. FIG. 13 provides a rear view of an exploded schematic diagram of a device for monitoring game activities in accordance with embodiments described herein. FIG. 14 provides a right-side view of an exploded schematic diagram of a device for monitoring game activities in accordance with embodiments described herein. FIG. 15 provides a perspective view of the bracket 1210 that may be screwed into the gaming table under a felt top in order to retrofit the gaming table with game monitoring capabilities.

A casino pit may generally have at least one computer system device connected to gaming tables, according to embodiments described herein. The computer system device may have various ports, including for example a USB port. The computer system device may be capable of running multiple tables simultaneously. The computer system device may also be connected to a network within the casino. A main server device may be used for all tables in the casino to host the game monitoring server device 20 and front end interface 80 (FIG. 1).

The client hardware device 30 may be configured with one or more sensors to generate game event data for provision to game monitoring server device 20. As described herein, game event data includes hand event data. The hand event data may include hand start data and hand stop data. The hand event data may be used to determine a hand count for a particular gaming table for a particular period of time. The hand event data (e.g., hand start data and hand stop data) may be processed and transformed by game monitoring server device 20 to generate hand count data. The client hardware device 30 may be configured with one or more sensor threshold values to trigger hand start and hand stop event data for the hand count. For example, if the sensor array is uncovered for X milliseconds (e.g., 2000 milliseconds) it will assume the hand has been finished and generate a hand stop event. To start the hand, if any sensor (or a particular portion) of the array is receiving reflected light above a threshold for two seconds the hand start event may be triggered.

As described, hand start and hand stop event data may be defined by a start time and a table identifier (e.g., an identifier to identify the particular gaming table associated with the game event data) linked to the hand event data of the hand being played. Accordingly, hand event data may be associated with a time stamp (e.g., start time, stop time, current time) and table identifier. The hand event data may also be associated with a player identifier, dealer identifier and other attributes.

The sensors used to generate hand count event data may be laser sensors with IR receivers and emitters (e.g., line-following laser sensors used for robots). The sensors used to generate hand count event data may be optical device, such as infrared sensors integrated with the gaming table.

Hand count event data may also be generated by imaging devices. For example, a camera may be positioned to monitor cards in one defined area. As a further example, there may be invisible Ink on the cards that may be detected by the imaging devices.

Hand count event data may also be generated by radio devices. For example, the cards may include radio frequency identifier chip or a near field communication chip.

Hand count event data also be generated by manual or mechanical/electronic devices, including a dealer button, dealer foot pedal, card switch, switch in the shoe and discard tray, and so on.

Gesture recognition technology may be used for embodiments of systems, methods and devices for monitoring game activities. For example, hand count event data may be generated by gesture recognition technology. For example, embodiments described herein may identify player gestures based on crowd sourcing multi-dimensional gesture data, which may be used to monitor game activities and to generate hand event data to count hands at gaming tables. Details of gesture recognition technology that may be implemented by embodiments described herein are provided in U.S. Application No. 61/924,530 entitled Systems and Methods of Identifying A Gesture Using Gesture Data Compressed By Principal Joint Variable Analysis, the entire contents of which is hereby incorporated by reference.

Embodiments described herein may identify gestures of players using a variety of gesture recognition techniques. By way of illustrative overview, systems, devices and methods described may implement techniques for identifying a gesture using gesture data. A classifier of a gesture recognition system may receive a frame comprising a set of gesture data points identifying locations of body parts of a player or other subject. The classifier may determine that a subset of the set of gesture data points is sufficient to recognize a first gesture. The subset may be stored into a database in reference to the first gesture. A recognizer may receive a new frame of new gesture data points identifying locations of body parts of a new player or other subject. The recognizer may recognize that the gesture of the new player corresponds to the first gesture responsive to comparing at least one new gesture data point from the new frame to at least one gesture data point of the subset. Crowd sourced techniques may be used to collect and process gesture data from different types of users.

Systems, devices and methods described herein may implement techniques for identifying a gesture using gesture data compressed by principal joint variable analysis ("PJVA"). As a frame of gesture data may include any number of features of gesture data, some of these gesture data features within a frame may be more relevant for determining a particular movement than other gesture data features. For example, when a system for identifying movements is detecting or determining a movement of a subject waving her hand, some gesture data features, such as those of right and left hands and right and left elbows, may be given more importance and weighted more heavily by the system than gesture data features of ankles, toes and knees. In these instances, when a determination of a movement depends more heavily of one group of body parts and joints, gesture data features of the more relevant body parts and joints may be selected and weighted more than others. In some instances, gesture data features that are not relevant for the determination of a particular movement or action may be completely deleted from the gesture data frames and may be left in the gesture data frames but not included in the processing during the detection process. These determinations of weighing or prioritization of some gesture data features over others and/or truncation of the gesture data frames to exclude some less relevant gesture data features may be referred to as the Principal Joint Variables Analysis.

These determinations of weighing or prioritization of some gesture data features over others and/or truncation of the gesture data frames to exclude some less relevant gesture data features may be referred to as the PJVA.

Gesture recognition according to various embodiments described herein may involve systems and methods of compressing and/or improving gesture data processing and accuracy based on Principal Component Analysis ("PCA"). PCA may be implemented alone or in combination with the PJVA. PCA may entail a technique in which three-dimensional data, describing movements of gesture data features in terms of X, Y and Z coordinates is collapsed from the three-dimensional data set into a two-dimensional or single-dimensional data set. For example, when a particular gesture data set includes gesture data frames whose change in a particular axis, such as for example X-axis, is greater or more important than changes in Z-axis or Y-axis, then this data set can be collapsed from X-Y-Z three-dimensional data set into an X-axis single-dimensional data set. In such an instance, Y and Z axis data may be entirely erased or filled in by constants, such as a zero, while the X-axis values are modified to include data that is reduced from three dimensions down to a single dimension. X-axis values, may therefore be modified after the Y and Z axis are excluded, to more accurately represent or approximate the information that prior to this matrix transformation used to be represented in what is now the erased Y and Z dimension values. In such embodiments, PCA can be used to compress the data by more heavily relying only on the axis of greater importance and mostly ignoring data from the other one or two axis which are of lesser importance. In some embodiments, the axis of greater importance may be the axis along which most changes in gesture data frames takes place from frame to frame.

Gesture recognition according to various embodiments described herein may involve systems and methods of compressing data based on slow and fast motion vector representation. Slow and Fast motion vector representations may be used to compress gesture data and use a smaller number of frames and then later on decompress the data by generating additional frames from the gesture data of the existing frames.

Gesture recognition according to various embodiments described herein may involve gesture data that may be used for sensitivity adjustments. For example, for recognizing a particular gesture, a remote client device or a crowdsourcing system may include a software interface that enables the user to modify or configure the sensitivity of the recognition for one or more gestures. The system may include the interface which may be taught or programmed to recognize a particular gesture or a movement at any range of sensitivities and using any number of frames of gesture data. The user interface may include various range options and settings for the user to specify the number of frames to be used, to select which frames to be used, to average frames of data and select the threshold values. The system may be configured or adjusted to use different sizes of data sets to recognize the gesture.

In some aspects, embodiments described herein relate to systems and methods for personalization and customization of the database gesture samples.

In some aspects, embodiments described herein relate to systems and methods of detecting interpersonal interaction between subjects, such as a dealer and a customer at a gaming table. This may be used to detect hand start events and hand stop events, for example. Hand stop events may also be referred to as hand end events, hand played events, hand completed events, and so on. Utilizing the various gesture recognition techniques, the embodiments described herein may identify movements or gestures of two or more individuals simultaneously. The movement or gesture detection may be implemented using self-referenced, or anchored, gesture data sets.

The system may be programmed to include data sets pertaining to various gestures and movements that are indicative of game play or cheating in a casino, such as a card game, or a roulette game, or any other game. The movements and various gestures may be indicative of hand start events and hand stop events, and may be used to determine hand count at gaming tables. The system described herein may utilize gesture data of joints or human body parts to observe behavior or movement of players at a casino gaming table to detect new hands, and so on. Gesture data may be customized to include gestures relating to game play and card hands.

Gesture data may be customized to also include positions of eye pupils to indicate locations towards which the user is looking. Gesture data locations of human pupils may be referenced with respect to a human nose, or a point between human eyes, to more accurately portray the direction at which the object is looking. Gesture data may also be customized to include human hands, including each of the finger tips and tips of the thumbs on each hand. The locations of the finger tips and thumb tips may be done in reference to another portion of a hand, such as a palm, or a joint such as a wrist of that particular hand. Gesture data may further include the mid sections of the fingers, underneath the tips, thereby more accurately portraying the motions or gestures of the human hands.

Using the techniques described herein, a system or device may utilize a camera, such as a detector, to view multiple players at a gaming table simultaneously. Gesture data may then be extrapolated and the gesture data of each of the players may be processed individually with respect to the learned gesture data stored in the database. Sensitivity of the detection or recognition may be adjusted to more quickly or more accurately focus on any particular motion or a movement of a casino gaming player. The gesture data may be used in combination with the sensor data to improve accuracy of the hand count data, for example.

A further configuration of the system may be done to allow the system to count and keep a track of locations of non-human objects, such as the chips on the casino gaming table and cards. The tracking of objects may be used to monitor game activities and determine hand count. For example, the system may be configured to identify and recognize a casino chip, as well as to keep track of the amount of chips in front of a player. Should a player suddenly and illegally remove chips from the pile, the system would be able to recognize the motion of the user, as well as identify that the chips are now missing. Further, the movement of chips may be indicative of a hand stop event or a hand start event and may be used by system as hand event data. The system may be configured to identify and recognize a casino card, as well as to keep track of the amount of cards in front of a player. The movement of cards may be indicative of a hand stop event or a hand start event and may be used by system as hand event data. The movement of a dealer or player may also be indicative of a hand stop event, or a hand start event and may be used by system as hand event data Referring now to FIG. 19, an embodiment of a frame of data captured by a camera detector filming a casino gaming table is illustrated. In brief overview, in this embodiment the system may be taught gestures and motions using stored gesture data. The system may now include a database which is filled with numerous gesture data sets for identifying motions and gestures. The system may keep processing the incoming stream of frames of data, checking the extrapolated gesture data between the players to see if the players are interacting. The system may also identify if the players are looking at each other, if they are looking at other players, if they are turned towards each other or other players, if they are signaling by hands or shoulders or body postures. The system may therefore observe the behavior and movement of the players' bodies, hands, eyes and even lips to see if the players are making any verbal statements. Gesture data may be configured to also include data points for upper and lower lip, which may be anchored or referenced to another part of a body, such as a nose or chin for example. In such instances, gesture data may include multiple reference points, not only one. In such instance, gesture data may be referenced with respect to a body waist point, while the gesture data for hands may be referenced by another anchor point, such as a wrist or a palm. Similarly, gesture data for lips and eyes, or eye pupils, may be referenced to another anchor point, such as a nose. Therefore, gesture data may include one or more reference points. The gesture data may be used to identify hand start and hand stop events.

Referring back to FIG. 19, a frame of data recorded by a camera detector captures four players 1902A-D at a casino gaming table. The captured data records the four players 1902A-D sitting and playing a card game along with a set of chips on the table. The captured data may record the players' 1902A-D lips positions and eye pupil positions with respect to a reference point, and further record hand movements, shoulder movements and movements of other body parts. Since the gesture data in this instance does not care particularly for the positions of body below the waist, the gesture data may be compressed using PJVA to remove gesture data points below the waist as they would not be particularly useful. Similarly, the system may also use PCA compression as well. Similarly, the system may identify other more interactive motions, such as the players 1902A-D waving to each other, hand signaling, hand shaking, approaching the chips, approaching the cards, holding the cards or any other movement or gesture which the casino may be interested in monitoring at a gaming table. The captured data may be used to generate hand start and hand stop events, and other game activities.

The system may be configured to detect theft or fraudulent activity in casinos, in addition to detecting other game activities, such as card hand play.

In some aspects, the embodiments described herein relate to systems and methods for monitoring movements of objects, such as for example casino chips and cards, in an environment where they are routinely utilized by a person, such as a casino dealer at a casino table. One aspect consists of systems and methods for accurately tracking the dealer's hands to identify hand start events and hand stop events, and other game activities. Furthermore, the present systems and methods may be used for monitoring a dealer by detecting movements that are indicative of game play, new hands, and so on.

Casino dealers may be required by casino management to use various gestures at different times throughout the game. The gestures may be indicative of a new bet, a request for a card, a new hand, an end to a hand and so on. This can assist in improving the monitoring of casino dealers and also making monitoring more efficient.

In one implementation, a camera device may be positioned at an angle where the casino dealer can be seen, as well as the position at which casino dealer's hands can be seen while the casino dealer is operating at the casino table. The camera may be positioned in front of and above a dealer for example, such that it may see the dealer's upper body (above the table) as well as the dealer's hands and the table. The camera device may also be positioned to view other players' hands.

As described, the system may comprise a web based interface interconnected with the aforementioned system components to allow the collected data to be displayed and organized. A casino official may then be able to log into the system using a username and password. From the web based interface, the casino official may be able to access the real time information for each dealer at every table, average number of hands per hour, net earnings, hand duration, current amount of chips at the table, as well as any suspicious moves that a dealer may have performed. This data may also be archived so that it can be accessed in the future.

In one aspect, embodiments described herein may implement an algorithm that monitors the hands of the dealer and other players. Gesture recognition of hands may be employed to monitor if the dealer, or a player to monitor game activities, including number of hands.

Associated video data may be brought to the attention of a manager for verification, whether in real time or whether placed in a queue of tickets to be monitored.

The system may be set up to alert the authorities when a particular event has taken place.

The system may also be set up to synchronize the gesture data monitoring with video monitoring, so that a video recording of the event detected by the gesture detection system may be replayed for confirmation.

In addition, embodiments described herein may involve systems and methods of monitoring chips and cards on the table using scales. A scale may be placed underneath the casino table, or underneath the area on which the chips or cards are placed. The scale may take measurements during the time periods when no movement of the chips or cards is done. For example, a dealer may and the players may place the cards or chips on the table, upon seeing a particular gesture, a scale may read the weight and the system may determine, based on the weight, as well as the monitoring mechanism, the number of cards or chips on the table. The weight reading may be done at a later point, to confirm that no cards or chips were taken off of the table.

The system may be initialized based on a gesture which a dealer may perform before starting the process of playing the casino game. This initialization gesture may be the gesture that flags a hand start event, such that the system begins to begin tracking the dealer.

In a brief overview, the present disclosure relates to a system of monitoring of casino dealers using gesture data recognition techniques.

Figure 20:
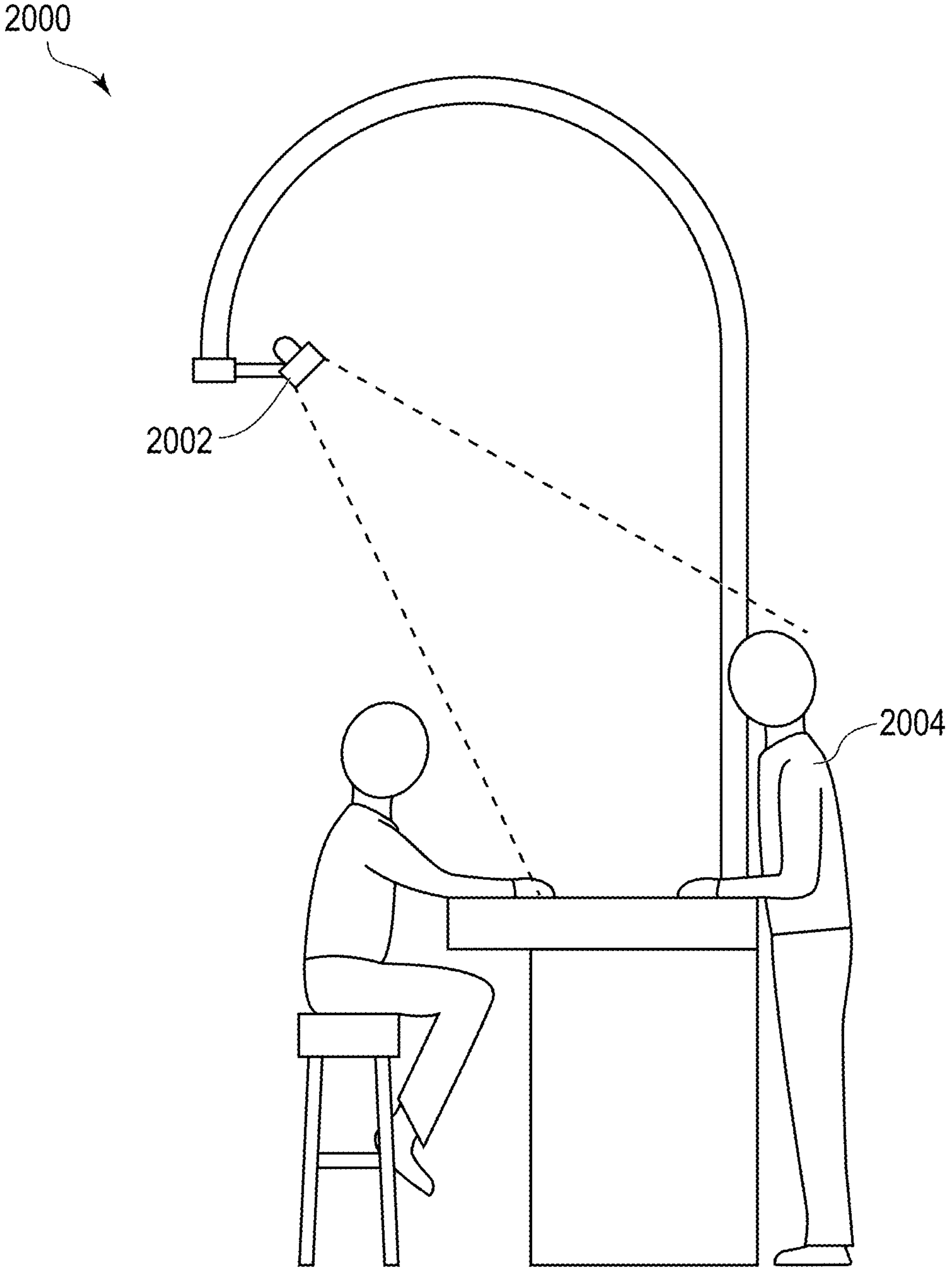
FIG. 20 illustrates a schematic diagram of an example environment of the dealer casino gesture monitoring system is displayed, according to some embodiments.

Referring now to FIG. 20, an embodiment of an environment of the dealer casino gesture monitoring system is displayed. A camera 2002 may be positioned in front and above the casino dealer, such that the dealer's entire upper body, as well as the casino table, is within the field of view of the camera.

Alternative image data acquisition mechanisms can be used. For example a vision sensor mechanism may be used. A vision sensor is includes a transmitter that emits high frequency electromagnetic waves. These waves are sent towards the casino table and dealer, though apply to any table. The waves then bounce back off of the table and dealer and are collected in a receiver of the device. From the speed of travel, and the intensity of the wave that has bounced back, a computer system using suitable software is able to calculate the exact distance from each pixel visible to the device. From this dataset, features of the human body such as for example hands, head and chest can be recognized and actively tracked in real time. Using the x, y, and z co-ordinates of these distinct feature sets for example procedural violations can be detected that have occurred in any given environment or scene being monitored.

The monitoring system may be configured to track various gestures, such as dealer hand clearing, pocketing, head touches, body touches, etc. Gestures may be classified as various types of gestures based on comparisons with reference gestures, and characteristics of the gestures may be indicated through various business rules and/or known requirements that may be provided on a case-by-case basis in relation to specific gaming venues. For example, a gaming venue may have overhead cameras situated above a dealer having a particular field of vision. The dealer may need to indicate to this camera that the dealer's hands are clear through the symbolic gestures, and the venue may derive the requirements for the gestures using a combination of known factors such as the field of view of the camera, the resolution of the camera, the orientation and/or position of the camera, etc.

Client hardware device 30 (FIG. 1) may include camera devices and scale devices, as described herein. Data acquired across multiple cameras may be processed using the crowd sourcing techniques previously described.

A camera may be used for monitoring a casino dealer, may be connected to a main computer, which may be connected to a network server and finally to the user interface. Additional cameras may be used to monitor other players to detect hand start and hand stop events. The camera may be directed at various targets, such as the casino dealer, casino player and other person or persons being monitored. Main computer may include the environment in which the aforementioned system components execute the gesture recognition functionality. Finally, the user interface on which the casino officials may monitor the targets, such as the dealers or players, may be connected to the main computer via the network server. In some embodiments, multiple cameras may be networked. In one embodiment, three cameras are required to monitor a table, each of the three cameras monitoring two betting areas. Various other configurations are possible. Other configurations are possible, where multiple tables and associated cameras, are networked. an enterprise implementation, the computer system includes one or more computers that include an administrator dashboard that may example a casino official to monitor one or more tables centrally. The computer system may be accessed for example remotely by the casino official, from suitable network-connected devices. The computer system may incorporate one or more analytical tools or methods for analyzing the gesture data. For example, a casino official may access comparative data for one or more particular dealers so as to enable the detection and monitoring of trends indicative of game play and new hands.

A casino dealer may make various gestures at different points in the game. For example, the casino dealer may make a hand motion on the surface of the table from one side to another, indicating that the table is clear. This motion may be used as a trigger to for a hand start or hand stop event. Similarly, other specific motions may be used as a trigger, such as a hand wave, finger movement, a hand sign or similar.

Gesture recognition of hands may be done by using gesture data points that include tips of each of the fingers: thumb, index finger, middle finger, ring finger and the pinky finger, as well as the location of the center of the palm of the hand. As such each finger may be represented, in the system, as a vector between the gesture data point (i.e. tip of the finger) and the center of the person's palm. Gesture data may then be organized to include locations of each of the fingertip locations with respect to the location of the center of the palm of the hand. Moreover, depending on the embodiments, gesture data may include locations of finger joints, such as the joints of each of the fingers between the intermediate phalanges and proximal phalanges and knuckles. Hand locations may be represented with respect to any reference point on the hand, such as the center of the palm, a knuckle, fingertip or any other part of the human body.

In brief overview, a camera may include the functionality of counting chips based on stacks. Color coding of the chips may be utilized to distinguish the chips and the stacks height may be determinative of the chip amount in the stacks. Chip stacks may be stored as gestures in the system and chip images may be compared against the stored data. When a match between the incoming frame of the chip stack and a stored known chip stack is determined, the system may establish the value of the chips in the stacks. Using this methodology, the system may determine the total value of the chips of each player and the dealer. This may be used to determine various game activities.

As described herein, embodiments described herein may use scales to detect cards and chips on a gaming table. The scale may be positioned underneath the portion of the table on which the chips are stacked or cards are dealt/played. The scale may take measurements of the weight responsive to a command by the system. As such, the system may determine when the chips or cards are not touched by the dealer or the player, thereby ensuring that a correct measurement is taken, and in response to such a determination send a command to measure the weight of the chips or cards. As an example, based on the weight and the coloring of the chips, the system may determine the present amount of the chips the user may have. This may be an example of game activity.

Using these techniques, the system may monitor and track not only the chips of the dealers, but also the chips of the players, may track the progress of each player and may be able to see when and how each player is performing, and may also monitoring new hands to determine hand count. The system may therefore know the amount of chips gained or lost in real time at a given time, and may also know the number of cards in each player's hand, and so on.

As described herein, embodiments described herein may provide systems, methods and devices with bet recognition capabilities. Bet recognition data may be generated and collected as game event data and may be connected to hand count data. For example, a hand may involve betting chips and system may detect chips using sensor hardware. Example details are provided in U.S. Application No. 62/168,395 incorporated herein by reference.

The bet recognition device may include a server device configured to receive bet event data in response to chip detection in a betting region.

The system may involve bet recognition cameras inside of a bumper of the gaming table on the dealer's side. The cameras may be in nearly the same location as this may simplify table retrofitting. All of components including computers for both bet recognition and hand count may be installed there.

The following is an illustrative example measurement setup for a scene point. A sensor estimates the radial distance by ToF or RADAR principle. The distance, p, is calculated at time T with electromagnetic radiation at light speed c, is ρ=CT. A transmitter emits radiation which travels towards the scene; it then is reflected back by the surface to the sensor receiver. The distance covered is now 2ρ at time T. The relationship can be written as:

$$p = \frac{c\tau}{2}$$

Signal $S_E(t)$ may be reflected back by the scene surface and may travel back towards a receiver (back to receiver) and written as:

$$S_E(t)=A_E[2\pi f_{mod}t]$$

Figure 21:
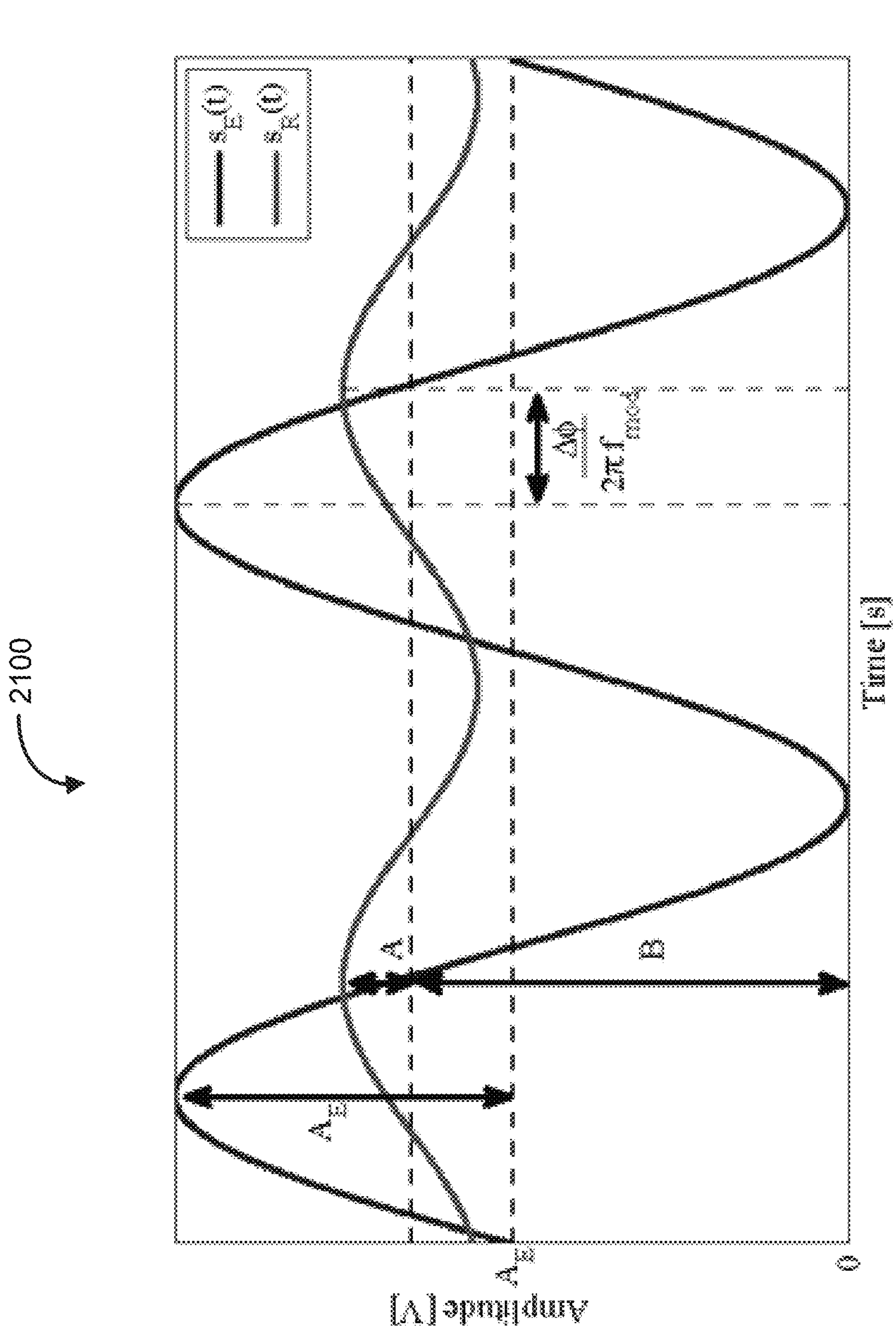
FIG. 21 illustrates a schematic graph of the amplitude of the received signal over time, according to some bet recognition embodiments.

Because of free-path propagation attenuation (proportional to the square of the distance) and the non-instantaneous propagation of IR optical signals leading to a phase delay ΔØ. Referring now to FIG. 21 there is shown a graph of the amplitude of the received signal over time. The Attenuated Amplitude of received signal is referred to as $A_R$ Interfering radiation at IR wavelength of emitted signal reaching the receiver is referred to as $B_R$.

Figure 22:
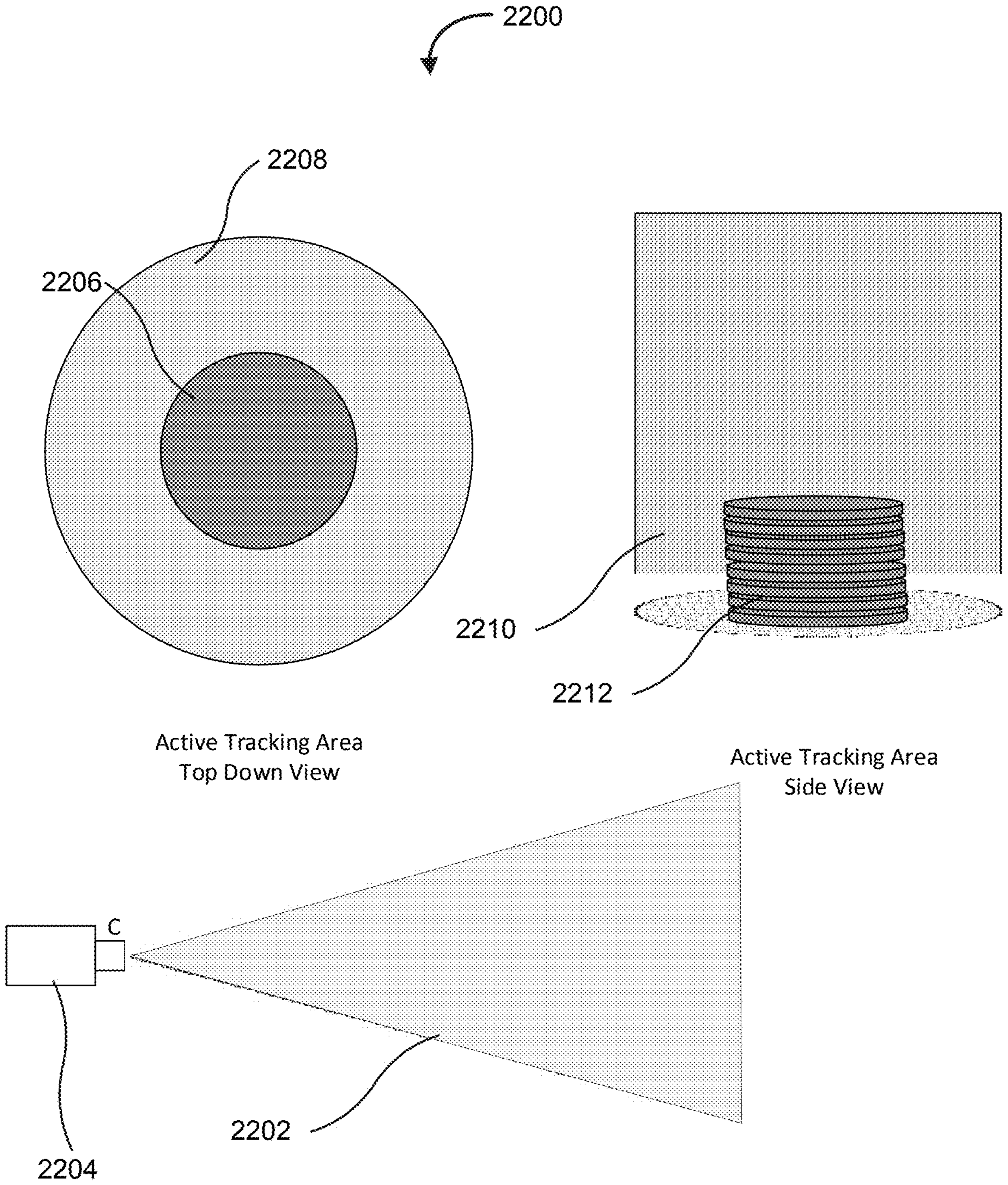
FIG. 22 illustrates a schematic diagram visualizing bet regions configured with sensors, according to some embodiments.

Referring now to FIG. 22 there is shown schematic diagrams visualizing bet regions configured with sensors. The bet region sensors are configured with sensors to detect chips placed within the region. FIG. 22 illustrates a top down view and side views. A camera or video device may be positioned distance p from the bet region to detect chips placed within the bet region.

Additionally, FIGS. 23-35 are provided as further non-limiting examples for illustrative purposes.

Figure 23:
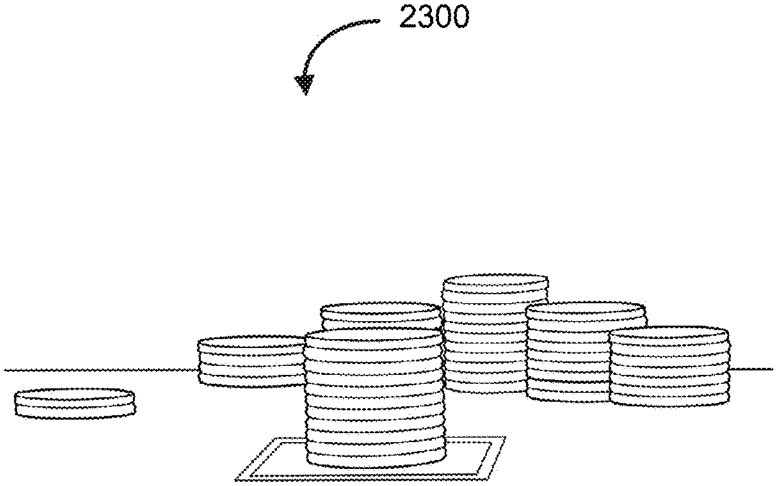
FIG. 23 is a color image photo of a single player bet, according to some embodiments.

FIG. 23 is a color image photo of a single player bet, according to some embodiments.

Figure 24:
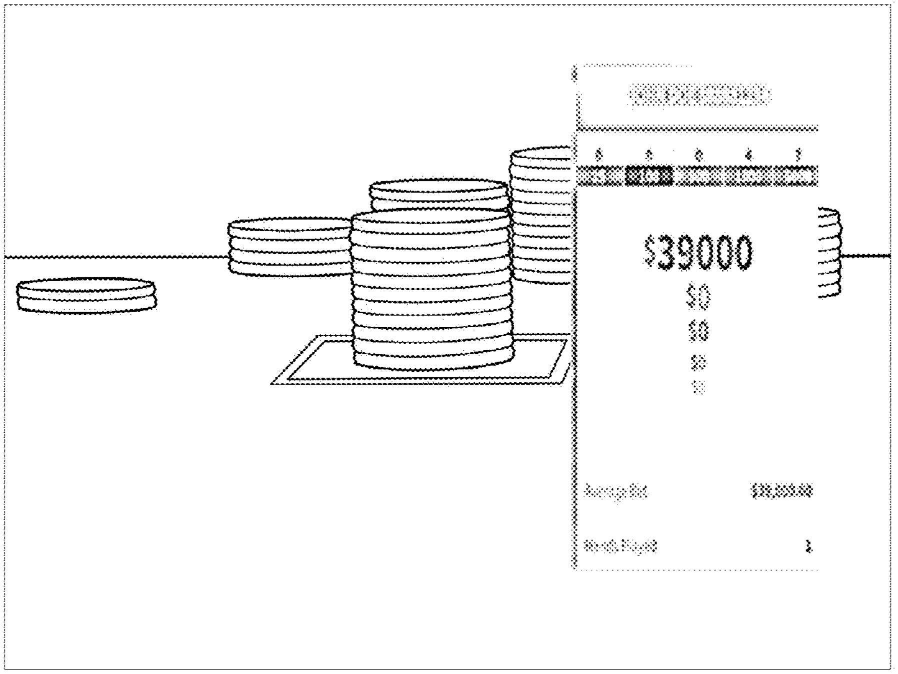
FIG. 24 is a screenshot of the system's analysis of the bet in FIG. 1, including bet recognition and chip identification of current bet with identification of the player and average of the player's last 5 bets at the table, according to some embodiments.

FIG. 24 is a screenshot of the system's analysis of the bet in FIG. 1, including bet recognition and chip identification of current bet with identification of the player and average of the player's last 5 bets at the table, according to some embodiments.

Figure 25:
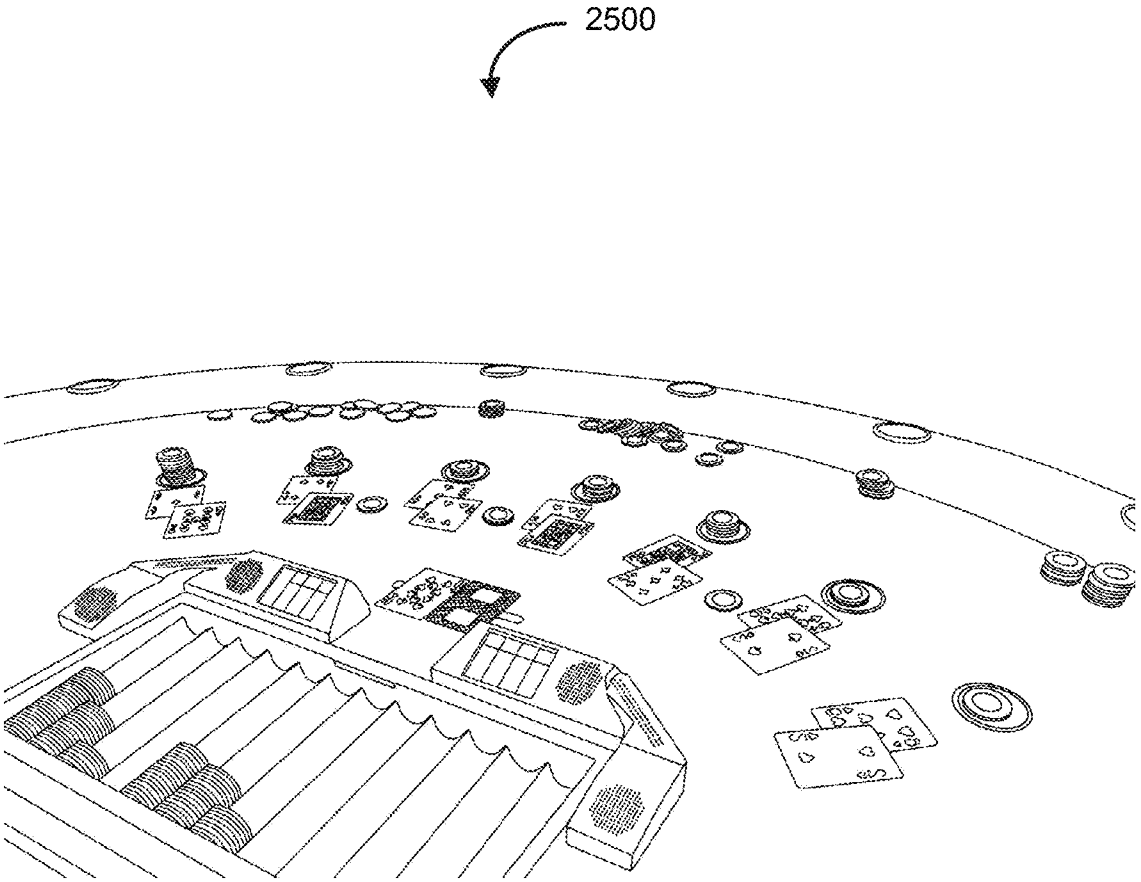
FIG. 25 is a photograph showing a bet recognition & hand count system integrated into a typical chip tray, according to some embodiments.

FIG. 25 is a photograph showing a bet recognition & hand count system integrated into a typical chip tray, according to some embodiments.

Figure 26:
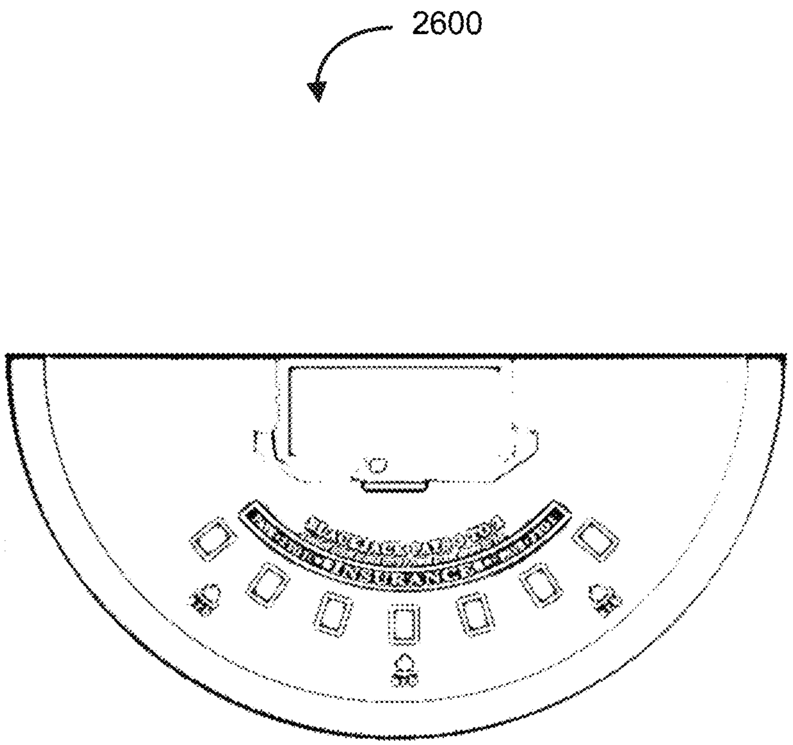
FIG. 26 is a top down view of the bet recognition & hand count as an insert for existing tray, according to some embodiments.

FIG. 26 is a top down view of the bet recognition & hand count as an insert for existing tray, according to some embodiments.

Figure 27:
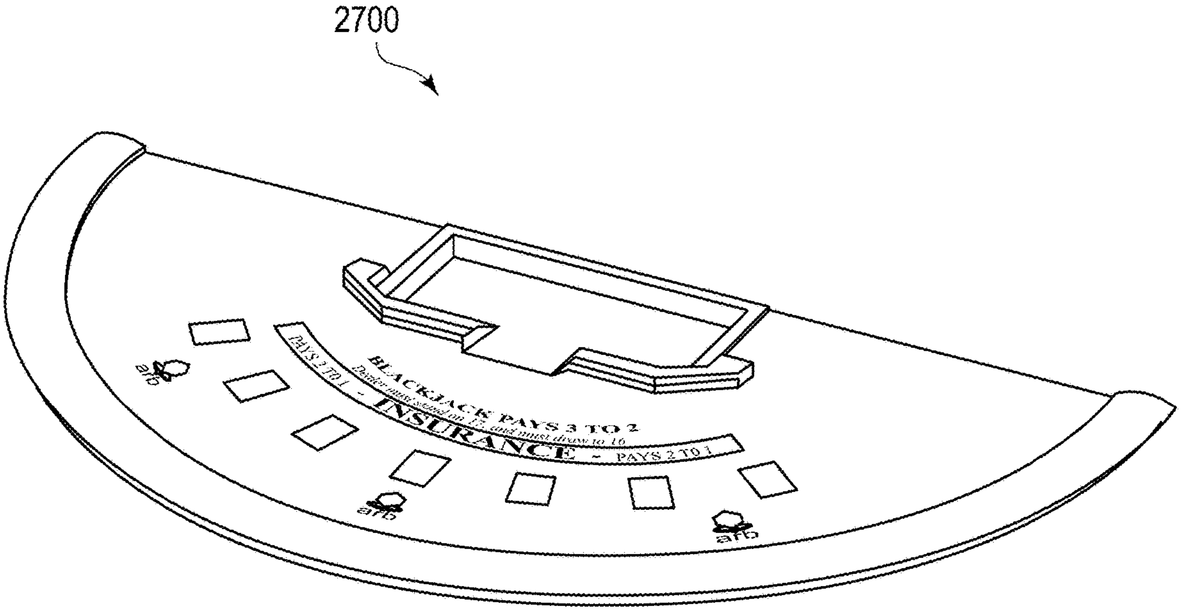
FIG. 27 is a player perspective view of the bet recognition & hand count system, according to some embodiments.

FIG. 27 is a player perspective view of the bet recognition & hand count system, according to some embodiments. As indicated in FIG. 27, in some embodiments, the system does not interfere with existing procedures or dealer hand positioning, and works with existing felts and bet positions without the need for modification to the table.

Figure 28:
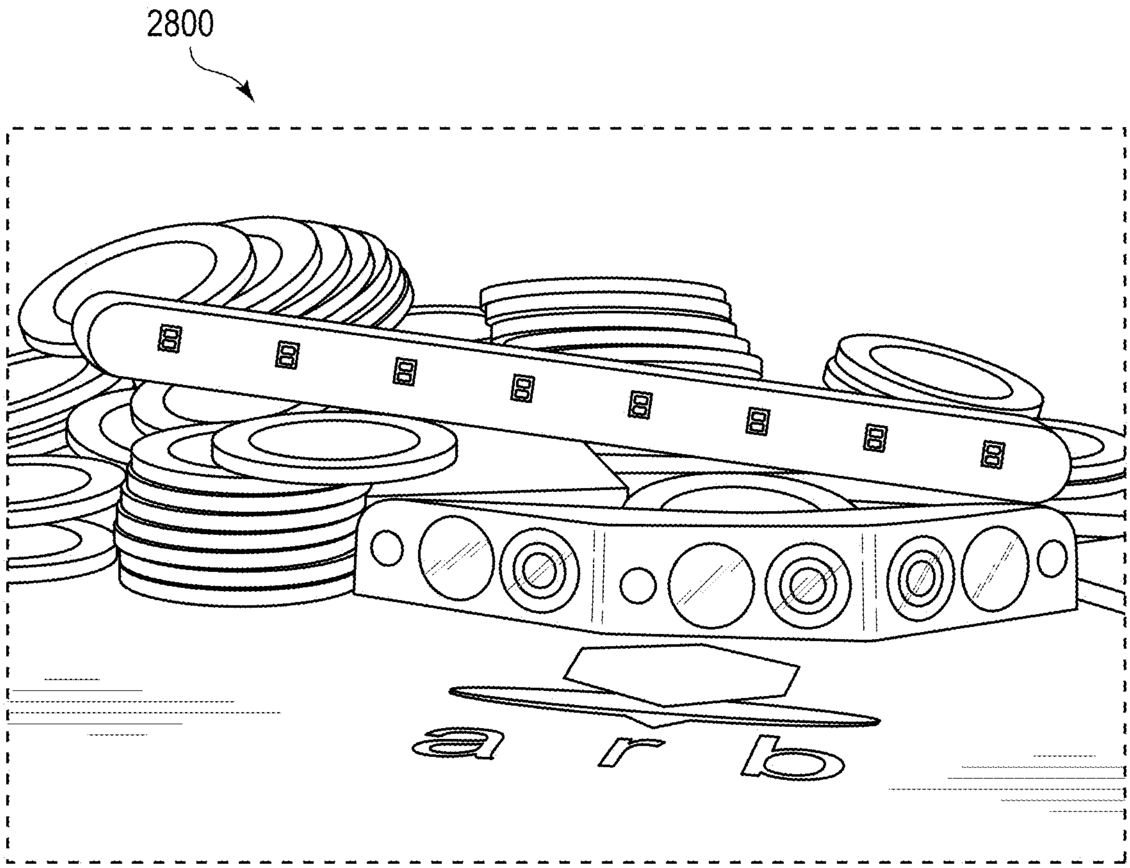
FIG. 28 is a photograph of an alternative configuration for the bet recognition & hand count system, according to some embodiments.

FIG. 28 is a photograph of an alternative configuration for the bet recognition & hand count system, according to some embodiments. Hardware design may be customized for each casino's needs depending on table, game, or features. Bet sensors can be installed in various positions on or around the table surface.

Figure 29:
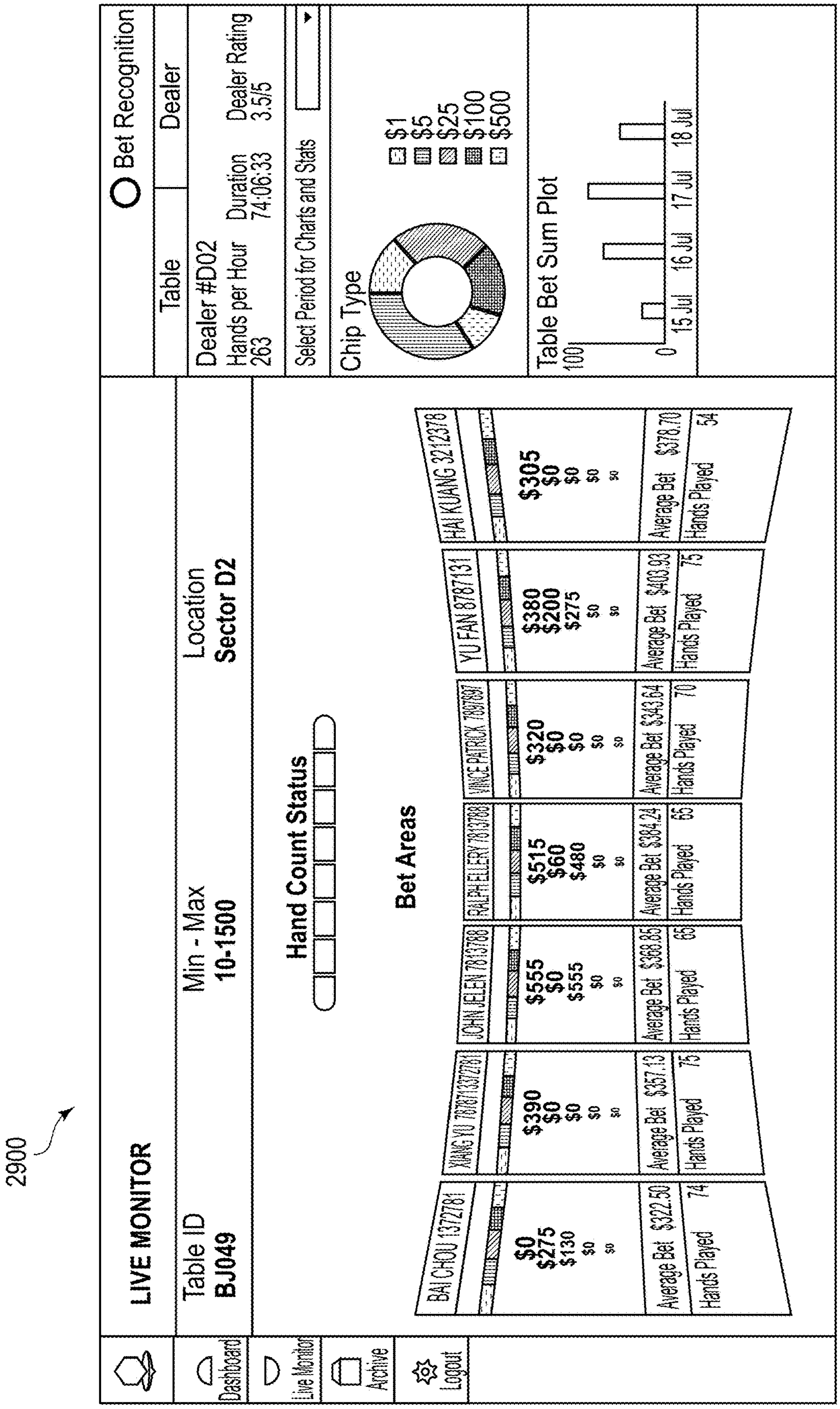
FIG. 29 is an example screenshot showing each player's details and their recent bets, according to some embodiments.

FIG. 29 is an example screenshot showing each player's details and their recent bets, according to some embodiments. The right side shows dealer analytics like productivity and efficiency.

Figure 30:
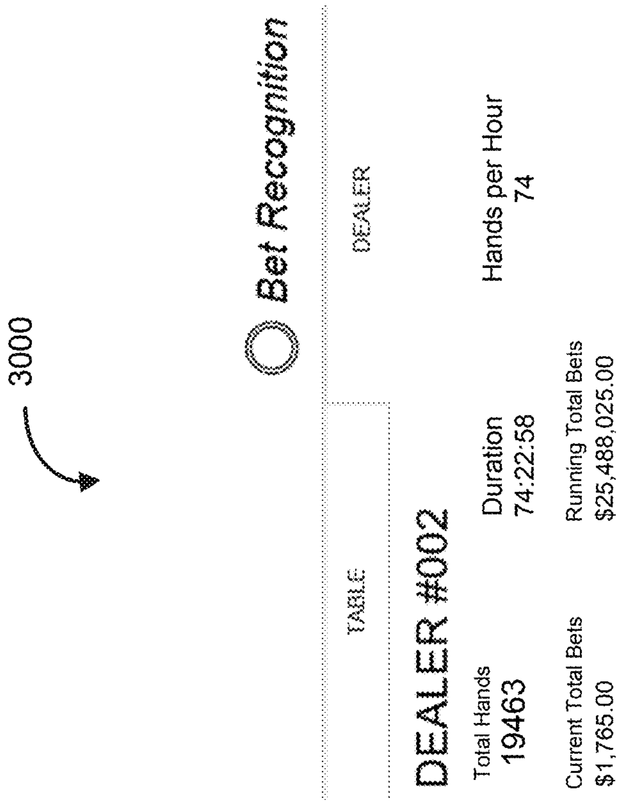
FIG. 30 is an example screenshot showing table analytics which include hands per hour, total hands, current total bets and running total bets, according to some embodiments.

FIG. 30 is an example screenshot showing table analytics which include hands per hour, total hands, current total bets and running total bets, according to some embodiments.

Figure 31:
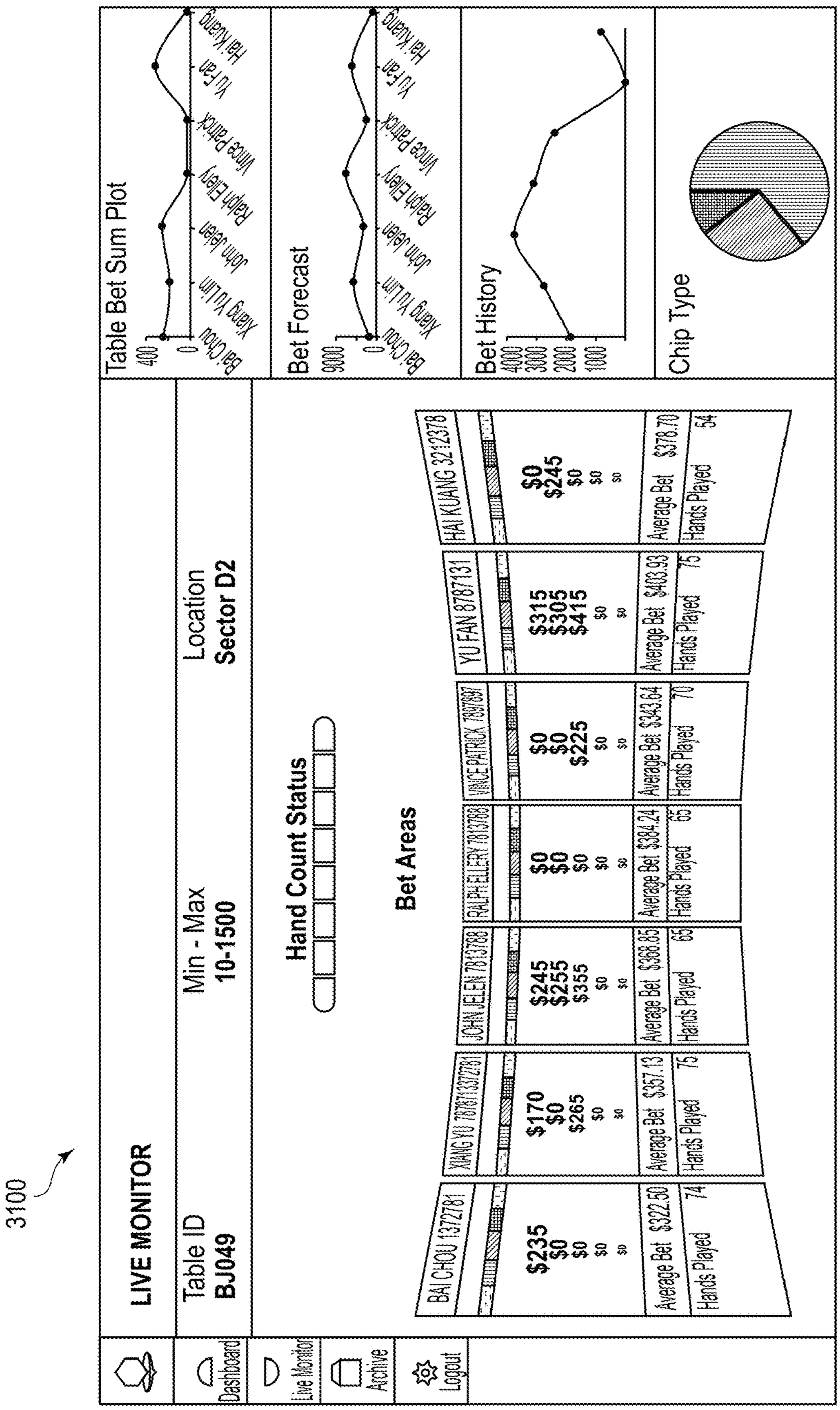
FIG. 31 is an example screenshot showing bet history, potential bet forecast, and table bet sum plot, according to some embodiments.

FIG. 31 is an example screenshot showing bet history, potential bet forecast, and table bet sum plot, according to some embodiments. The pie chart shows chip denomination popularity for each table.

Figure 32:
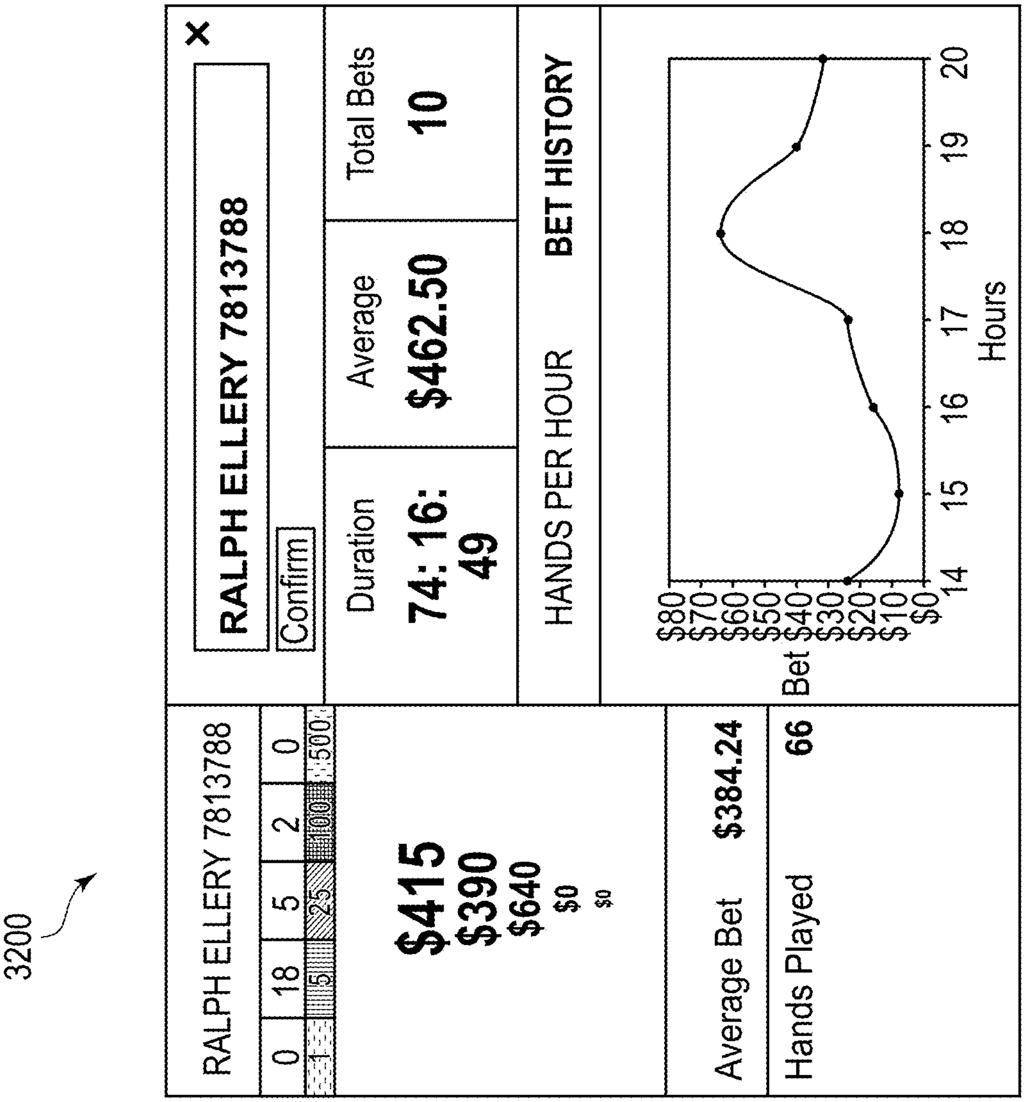
FIG. 32 is an example screenshot showing individual player bet history, hands per hour and average bet, according to some embodiments.

FIG. 32 is an example screenshot showing individual player bet history, hands per hour and average bet, according to some embodiments.

Figure 33:
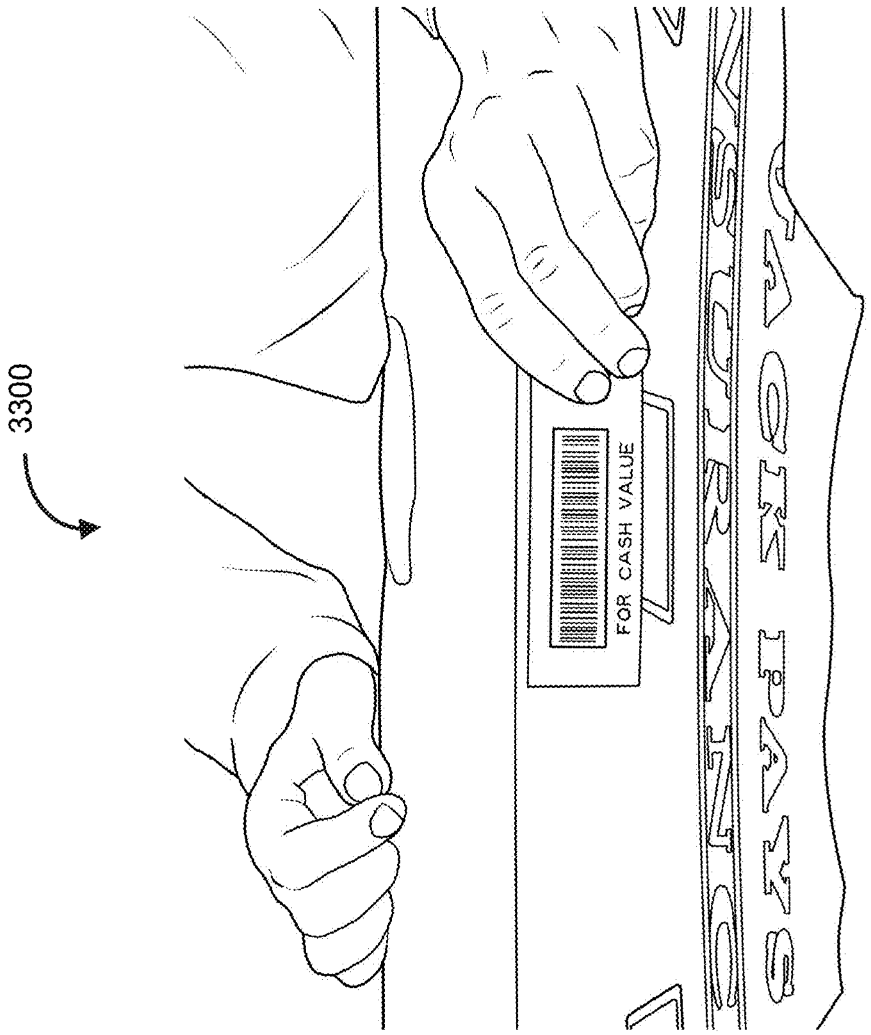
FIG. 33 is a screenshot of a player providing real-time barcode scanning over player areas for a ticketing in/ticketing out system (TITO), according to some embodiments.

FIG. 33 is a screenshot of a player providing real-time barcode scanning over player areas for a ticketing in/ticketing out system (TITO), according to some embodiments. This lets the player perform TITO-based transactions at the table, similar to those performed on a slot machine but with dealer validation.

Figure 34:
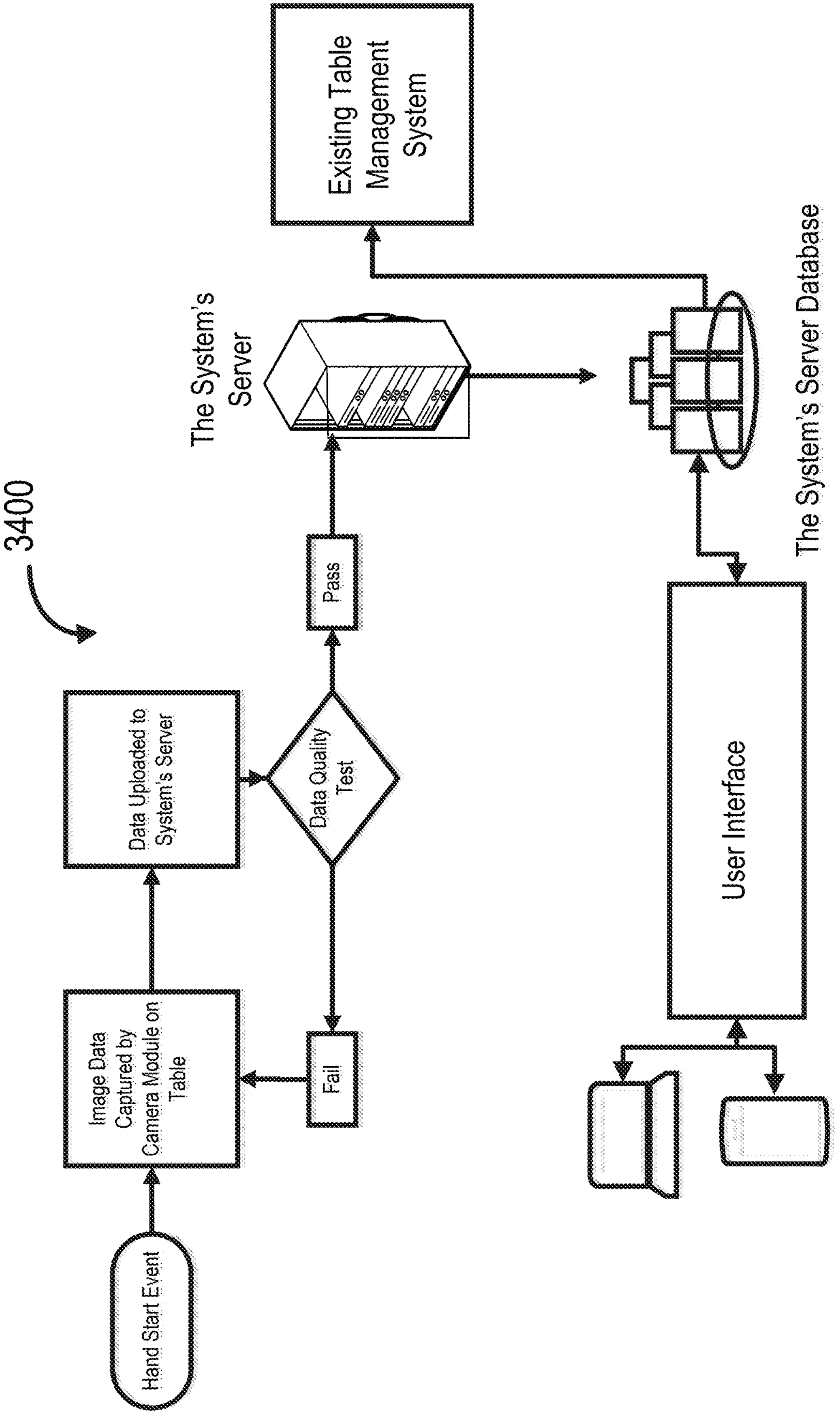
FIG. 34 is a block schematic diagram of a bet recognition & hand count system, according to some embodiments.

FIG. 34 is a block schematic diagram of a bet recognition & hand count system, according to some embodiments.

Figure 35:
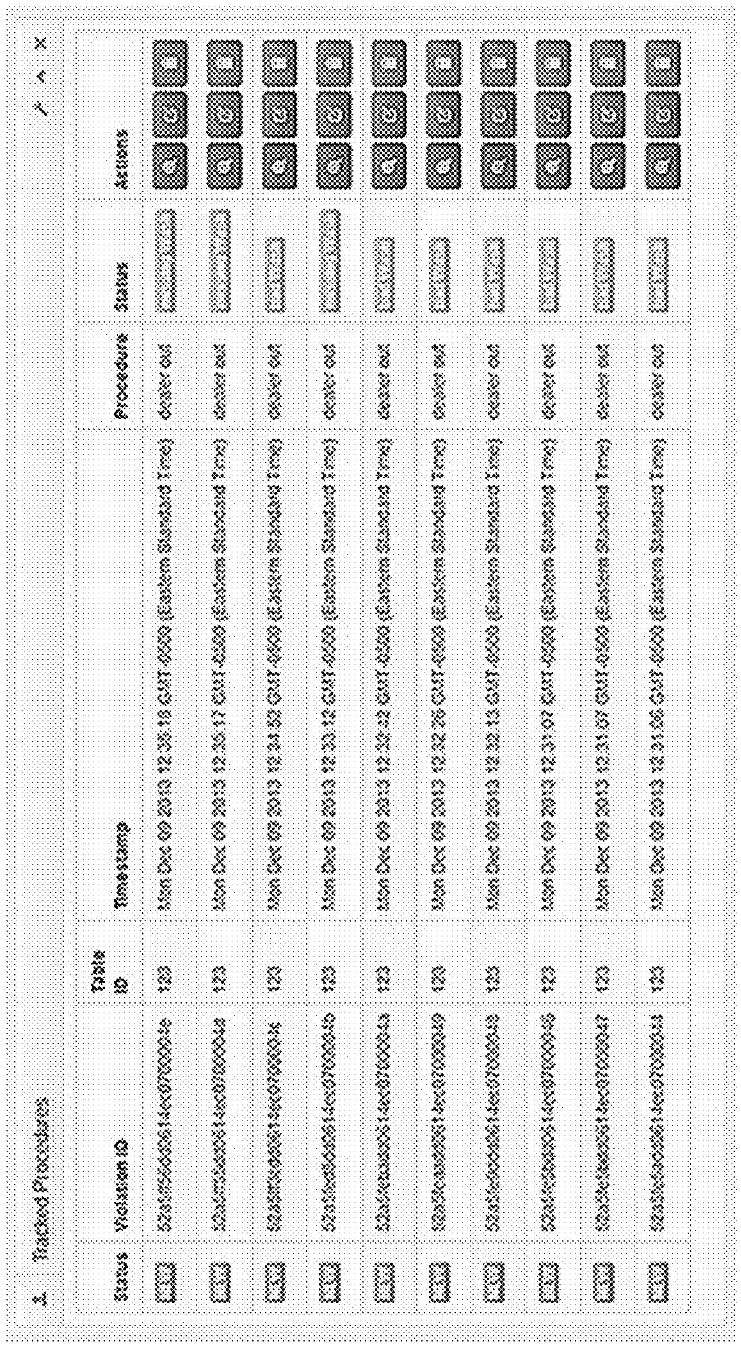
FIG. 35 is a screenshot of an example real-time dealer procedural tracking and infraction log for hand clearing and pocketing systems, according to some embodiments.

FIG. 35 is a screenshot of an example real-time dealer procedural tracking and infraction log for hand clearing and pocketing systems, according to some embodiments.

Figure 36:
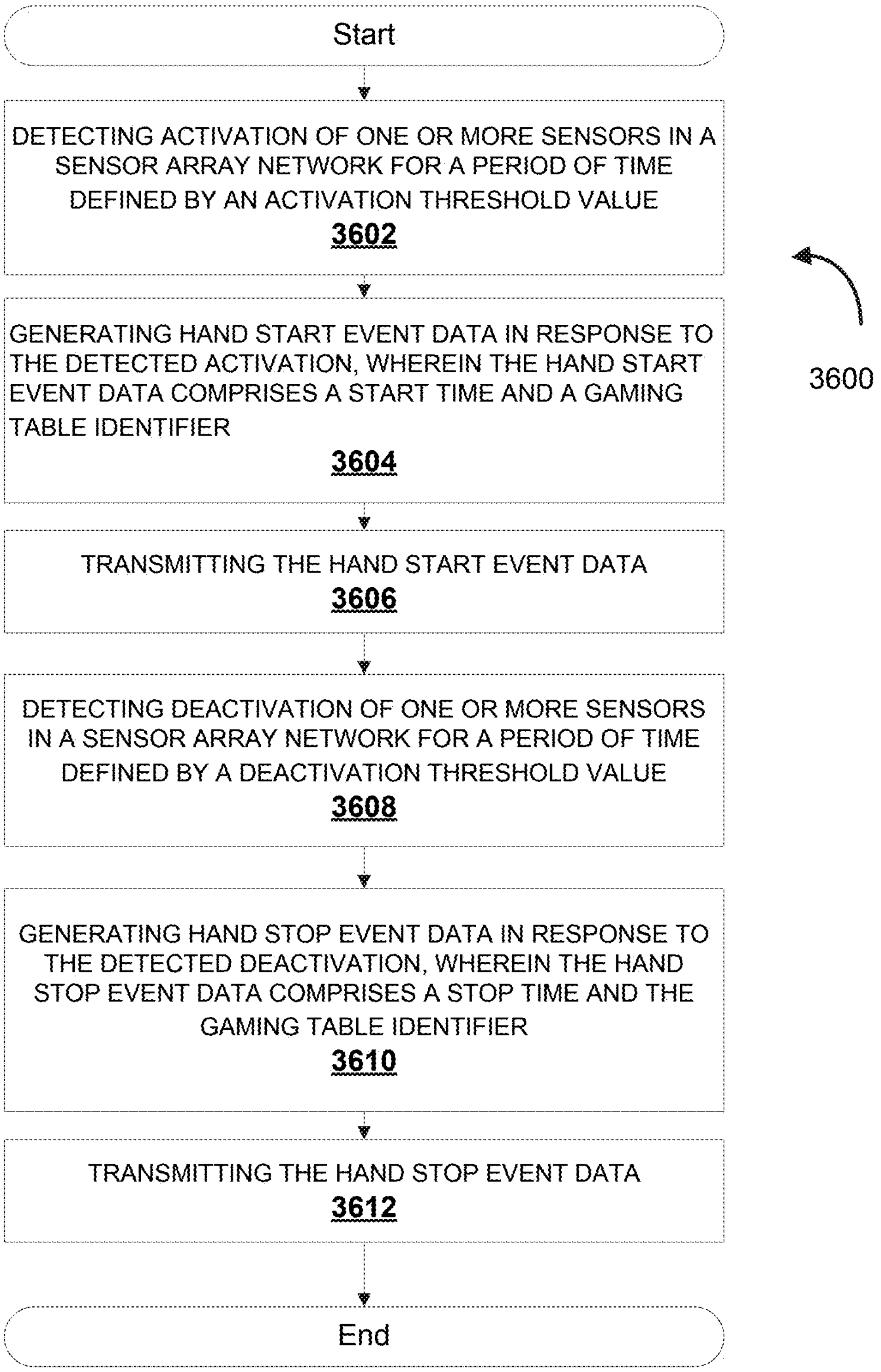
FIG. 36 is a sample workflow, according to some embodiments.

FIG. 36 is a sample workflow 3600, according to some embodiments. Various steps may be provided, including 3602 detecting activation of one or more sensors in a sensor array network for a period of time defined by an activation threshold value; 3604 generating hand start event data in response to the detected activation, wherein the hand start event data comprises a start time and a gaming table identifier; 3606 transmitting the hand start event data; 3608 detecting deactivation of one or more sensors in a sensor array network for a period of time defined by a deactivation threshold value; 3610 generating hand stop event data in response to the detected deactivation, wherein the hand stop event data comprises a stop time and the gaming table identifier; and 3612 transmitting the hand stop event data. In some embodiments, a further step of processing the hand start event data and the hand stop event data to generate hand count data may be included.

In some embodiments, processing of the hand start event data and the hand stop event data to generate hand count data further includes determining estimated values for hands per defined period of time for the plurality of gaming tables.

In some embodiments, processing of the hand start event data and the hand stop event data to generate hand count data further includes determining, for each gaming table of the plurality of gaming tables, an estimated value for an earning coefficient for the respective table. In some embodiments, the workflow further comprises determining player hand count data for at least one player playing cards at at least two gaming tables of the plurality of gaming tables, wherein the at least one player is identified at each of the at least two gaming tables. In some embodiments, the workflow further comprises generating an interface for provisioning notifications to the end user systems.

Figure 37:
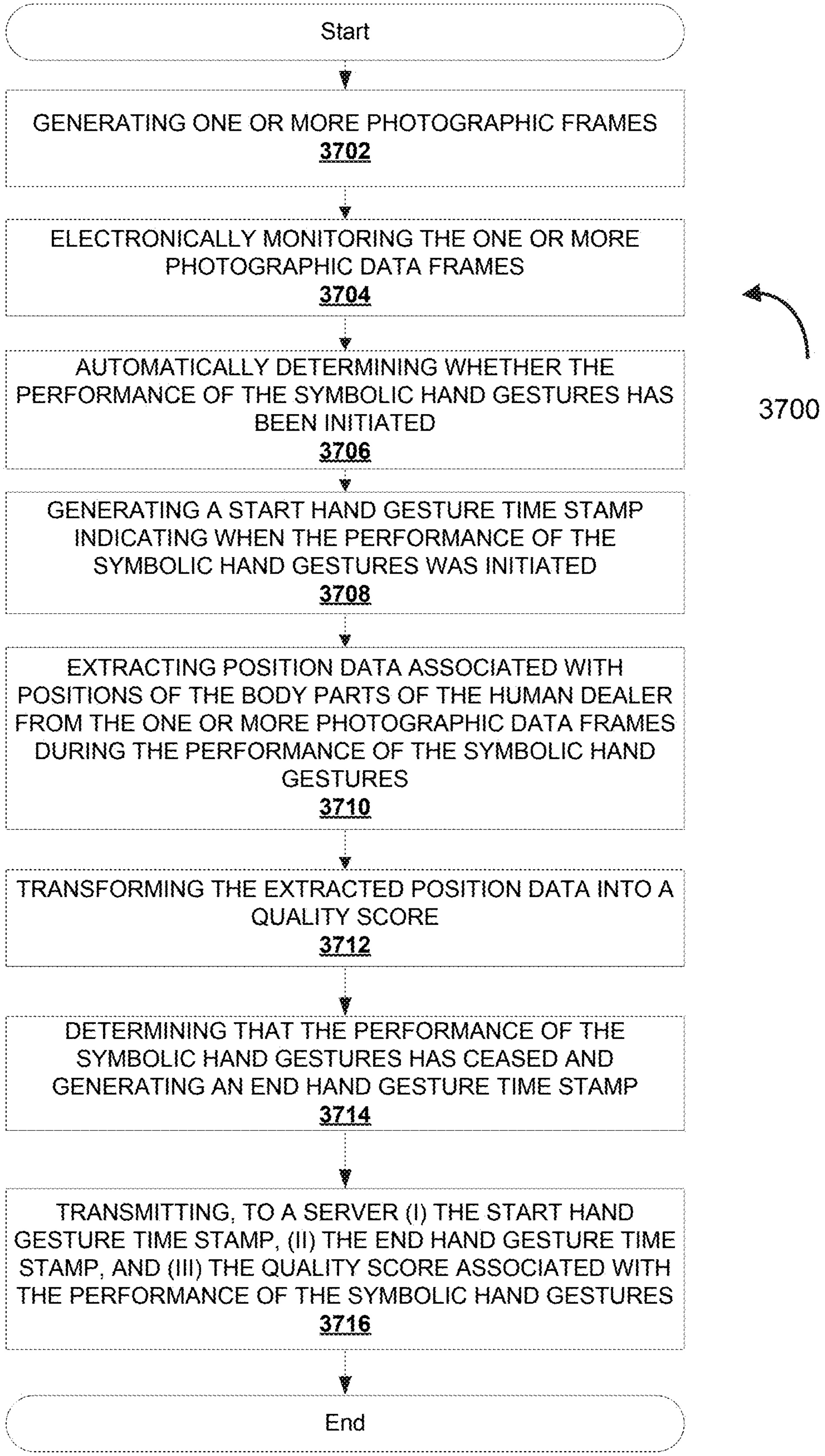
FIG. 37 is a sample workflow, according to some embodiments.

FIG. 37 is a sample workflow 3700, according to some embodiments. Workflow 3700 may include, for example, 3702 generating one or more photographic frames, each one of the one or more photographic frames capturing one or more positions of body parts of the human dealer at a corresponding point in time during the performance of the symbolic hand gestures; 3704 electronically monitoring the one or more photographic data frames; 3706 automatically determining whether the performance of the symbolic hand gestures has been initiated; 3708 upon determining that the performance of the symbolic hand gestures has been initiated, generating a start hand gesture time stamp indicative when the performance of the symbolic hand gestures was initiated; 3710 automatically extracting position data associated with the one or more positions of the body parts of the human dealer from the one or more photographic data frames generated by the one or more sensors during the performance of the symbolic hand gestures; 3712 transforming the extracted position data into a quality score associated with the performance of the symbolic hand gestures; 3714 automatically determining that the performance of the symbolic hand gestures has ceased; and 3716 upon determining that the performance of the symbolic hand gestures has ceased, generating an end hand gesture time stamp indicative when the performance of the symbolic hand gestures has ceased; and transmitting, to a server as part of hand count data, (i) the start hand gesture time stamp, (ii) the end hand gesture time stamp, and (iii) the quality score associated with the performance of the symbolic hand gestures.

In some embodiments, the workflow further comprises providing notifications to a front end interface device based on at least one of (i) the start hand gesture time stamp, (ii) the end hand gesture time stamp, and (iii) the quality score associated with the performance of the symbolic hand gestures.

In some embodiments, the workflow further comprises associating at least one of (i) the start hand gesture time stamp, (ii) the end hand gesture time stamp, and (iii) the quality score associated with the performance of the symbolic hand gestures with an electronic profile associated with the human dealer.

In some embodiments, the workflow further comprises monitoring a plurality of hand count events associated with the human dealer, the plurality of hand count events being associated with a plurality of performed symbolic hand gestures, each one of the plurality of performed symbolic hand gestures corresponding to a corresponding quality score; continuously tracking an average quality score for the human dealer in the electronic profile associated with the human dealer; and upon determining that the average quality score has decreased below a pre-defined threshold, automatically indicating, through notifications provided to a front end interface device, an electronic request to alternate the human dealer.

The embodiments of the systems, devices and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, smartphone device, UMPC tablets and wireless hypermedia device or computing devices capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements are combined, the communication interface may be a software communication interface, such as those for inter-process communication. In still other embodiments, there may be a combination of communication interfaces implemented as hardware, software, and combination thereof.

Each program may be implemented in a high level procedural or object oriented programming or scripting language, or a combination thereof, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. One should appreciate that the systems and methods described herein may detect game activities, including the start of a hand and the end of a hand, generate data regarding the detected game activities for transmission, transformation, notification, and processing.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Embodiments are described herein with reference to illustrative and non-limiting examples. Alternatives and variations of the described examples may be used to implement various embodiments of systems, methods, and devices for monitoring game activity data.

The invention claimed is:

1. A system for monitoring game activities at a plurality of gaming tables comprising:

one or more sensors configured to generate one or more photographic frames, each one of the one or more photographic frames capturing one or more positions of body parts of a human at a corresponding point in time during a performance of symbolic hand gestures by the human; and a processor configured to:

electronically monitor the one or more photographic data frames;

determine whether the performance of the symbolic hand gestures has been initiated;

upon determining that the performance of the symbolic hand gestures has been initiated, automatically extract position data associated with the one or more positions of the body parts of a human dealer from the one or more photographic data frames generated by the one or more sensors during the performance of the symbolic hand gestures;

determine that the performance of the symbolic hand gestures has ceased based on the position data;

upon determining that the performance of the symbolic hand gestures has ceased, transmit, to a game monitoring server, hand count data based at least on the performance of the symbolic hand gestures.

2. The system of claim 1, wherein the hand count data includes at least one of (i) a start hand gesture time stamp, (ii) an end hand gesture time stamp, and (iii) a quality score associated with the performance of the symbolic hand gestures.

3. The system of claim 1, wherein the processor is configured to associate the performance of the symbolic hand gestures with an electronic profile associated with the human.

4. The system of claim 3, wherein the processor is configured to:

monitor a plurality of hand count events associated with the human, the plurality of hand count events being associated with a plurality of performed symbolic hand gestures as tracked in the one or more photographic data frames.

5. The system of claim 1, wherein the hand count data comprises hand start event data comprising a start time and a table identifier, and hand stop event data comprising a stop time and the table identifier.

6. The system of claim 5, wherein the processor generates aggregated hand count data by determining estimated values for hands per defined period of time for the plurality of gaming tables based at least on the hand count data and the table identifier.

7. The system of claim 5, wherein the processor generates aggregated hand count data by determining, for each gaming table of the plurality of gaming tables, an estimated value for an earning coefficient for the respective table based at least on the hand count data and the table identifier.

8. The system of claim 1, wherein the processor determines player hand count data for at least one player that plays on at least two gaming tables of the plurality of gaming tables, wherein the at least one player is identified at each of the at least two gaming tables.

9. The system of claim 1, wherein the processor generates an interface for provisioning notifications to an end user system, wherein the interface comprises:

a dashboard page displaying, for the plurality of gaming tables, in near real-time hand count data, and video surveillance;

one or more interface activators for receiving and initiating a control commands;

a management page for management of the plurality of gaming tables; and a historical data page displaying historical hand count data for the plurality of gaming tables.

10. A device for monitoring game activities at gaming tables comprising:

an imaging device for gesture recognition, coupled to a microcontroller, the imaging device configured to:

generate one or more photographic frames, each one of the one or more photographic frames capturing one or more positions of body parts of a human at a corresponding point in time during a performance of symbolic hand gestures; and the microcontroller is configured to:

electronically monitor the one or more photographic data frames;

determine whether the performance of the symbolic hand gestures has been initiated;

upon determining that the performance of the symbolic hand gestures has been initiated, automatically extract position data associated with the one or more positions of the body parts of the human from the one or more photographic data frames generated by one or more sensors during the performance of the symbolic hand gestures;

determine whether the performance of the symbolic hand gestures has ceased based on the position data;

upon determining that the performance of the symbolic hand gestures has ceased, transmit hand count data based at least on the performance of the symbolic hand gestures.

11. The device of claim 10, wherein a sensor array network comprises the one or more sensors with an optical receiver and an emitter.

12. The device of claim 10, wherein the microcontroller generates hand start events and hand stop events based on sensor activation and sensor deactivation upon exceeding or falling within predefined threshold values.

13. The device of claim 10, the device further comprising an imaging device for gesture recognition.

14. The device of claim 13, wherein the imaging device for the gesture recognition includes one or more cameras.

15. The device of claim 14, wherein the symbolic hand gestures are performed by the human before or after a gaming hand is played.

16. A method for monitoring game activities at a plurality of gaming tables comprising, by a processor:

electronically monitoring one or more photographic data frames;

determining whether performance of symbolic hand gestures has been initiated;

upon determining that the performance of the symbolic hand gestures has been initiated, extracting position data associated with one or more positions of the body parts from one or more photographic data frames generated by the one or more sensors during the performance of the symbolic hand gestures;

determining that the performance of the symbolic hand gestures has ceased;

upon determining that the performance of the symbolic hand gestures has ceased, transmitting, hand count data based at least on the performance of the symbolic hand gestures.

17. The method of claim 16, wherein generating of the hand count event data further includes determining estimated values for hands per defined period of time for the plurality of gaming tables.

18. The method of claim 16, further comprising: determining, for each gaming table of the plurality of gaming tables, an estimated value for an earning coefficient for the respective table based at least on the hand count data.

19. The method of claim 16, further comprising determining player hand count data for at least one player that plays on at least two gaming tables of the plurality of gaming tables, wherein the at least one player is identified at each of the at least two gaming tables.

20. The method of claim 16, further comprising generating an interface for provisioning notifications to an end user systems, wherein the interface comprises:

a dashboard page displaying for the plurality of gaming tables, in real or near real-time, hand count data;

a management page for management of the plurality of gaming tables; and a historical data page displaying historical hand count data for the plurality of gaming tables.

* * * * *